US012688782B2

(12) United States Patent
Carter et al.

(10) Patent No.: US 12,688,782 B2
(45) Date of Patent: Jul. 21, 2026

(54) METHOD, SYSTEM, AND COMPUTER-READABLE MEDIUM FOR CALIBRATING PERFORMANCE PARAMETERS OF AN AIRCRAFT DURING A PHANTOM FUEL PROCEDURE

(71) Applicant: Mammoth Freighters LLC, Fort Worth, TX (US)

(72) Inventors: David Carter, Keller, TX (US); Jared Carter, Roanoke, TX (US); Paul Desrochers, Weatherford, TX (US)

(73) Assignee: Mammoth Freighters LLC, Fort Worth, TX (US)

( * ) Notice: Subject to any disclaimer, the term of this patent is extended or adjusted under 35 U.S.C. 154(b) by 125 days.

(21) Appl. No.: 18/742,408

(22) Filed: Jun. 13, 2024

(65) Prior Publication Data

US 2024/0420577 A1 Dec. 19, 2024

Related U.S. Application Data

(60) Provisional application No. 63/507,748, filed on Jun. 13, 2023.

(51) Int. Cl.
*G08G 5/34* (2025.01)
*G08G 5/21* (2025.01)

(52) U.S. Cl.
CPC ................. *G08G 5/34* (2025.01); *G08G 5/21* (2025.01)

(58) Field of Classification Search
CPC .. B64D 37/00; B64F 1/28; G08G 5/34; G08G 5/21; Y02T 50/40; Y02T 50/80
See application file for complete search history.

(56) References Cited

U.S. PATENT DOCUMENTS

| | | | | |
|---|---|---|---|---|
| 5,070,458 A * | 12/1991 | Gilmore | G05D 1/0005 702/182 |
| 6,308,131 B1 * | 10/2001 | Fox | G01G 19/07 177/136 |

(Continued)

FOREIGN PATENT DOCUMENTS

| | | | | |
|---|---|---|---|---|
| CN | 117669029 A * | 3/2024 | G06F 30/20 |
| EP | 1595789 A1 * | 11/2005 | B64F 1/28 |

(Continued)

OTHER PUBLICATIONS

RU-2008129894-A translation (Year: 2010).*

(Continued)

*Primary Examiner* — Kyle T Johnson
(74) *Attorney, Agent, or Firm* — Reed Smith LLP; Amardeep S. Grewal

(57) ABSTRACT

A system, method, and computer-readable medium for calibrating performance parameters of an aircraft during a phantom fuel procedure, including determining an independent fuel weight parameter during operation of the aircraft value based on output of fuel level sensors of a fuel quantity subsystem coupled to the aircraft flight control system, receiving a zero fuel weight parameter, receiving a fuel weight parameter corresponding to a weight of fuel onboard the aircraft and a phantom fuel value, determining a gross weight parameter based on the zero fuel weight, determining a fuel consumption parameter value of the aircraft based on output of fuel flow sensors coupled to the aircraft flight control system, updating the gross weight parameter during operation of the aircraft based on the fuel weight parameter and the fuel consumption parameter value, and determining performance parameter for the aircraft during operation of the aircraft based on the gross weight parameter.

33 Claims, 32 Drawing Sheets

(56) References Cited

U.S. PATENT DOCUMENTS

| | | | | | |
|---|---|---|---|---|---|
| 8,738,200 | B2 * | 5/2014 | Mere | G08G 5/21 701/14 |
| 10,556,703 | B1 * | 2/2020 | Skola | G07C 5/08 |
| 10,648,850 | B2 * | 5/2020 | Kim | G05D 1/042 |
| 2013/0001355 | A1 * | 1/2013 | Cox | B64C 25/405 244/50 |
| 2013/0075532 | A1 * | 3/2013 | Fuscone | B64F 1/28 244/135 A |
| 2015/0279218 | A1 * | 10/2015 | Irrgang | G08G 5/58 701/3 |
| 2016/0031565 | A1 * | 2/2016 | Mohan | B64D 37/26 701/3 |
| 2019/0339111 | A1 * | 11/2019 | Kim | G01G 19/12 |
| 2020/0105146 | A1 * | 4/2020 | Schwartz | G08G 5/34 |
| 2021/0009282 | A1 * | 1/2021 | Long | G06Q 10/06315 |
| 2021/0047054 | A1 * | 2/2021 | Fuscone | B64D 37/00 |
| 2021/0139158 | A1 * | 5/2021 | Tang | B64D 37/00 |
| 2024/0420577 | A1 * | 12/2024 | Carter | G08G 5/21 |

FOREIGN PATENT DOCUMENTS

| | | | | | |
|---|---|---|---|---|---|
| EP | 3165466 | A1 * | 5/2017 | B64D 37/14 |
| GB | 2543211 | A * | 4/2017 | B64D 37/00 |
| JP | 2009520912 | A * | 5/2009 | G01F 23/804 |
| KR | 20140021332 | A * | 2/2014 | G01F 22/00 |
| RU | 2008129894 | A * | 1/2010 | G01F 23/804 |

OTHER PUBLICATIONS

KR-20140021332-A translation (Year: 2014).*

CN-117669029-A translation (Year: 2024).*

JP-2009520912-A translation (Year: 2009).*

Examination_of_excessive_fuel_consumption_for_transport_jet2015 (Year: 2015).*

Factors_affecting_the_rate_of_fuel_consumption_in_aircraft2021 (Year: 2021).*

International Search Report and Written Opinion cited in PCT/US24/33778, Sep. 12, 2024, 15 pages.

* cited by examiner

| Weight (x1000 lbs) | $VREF_{20}$ | $VREF_{20}$ (no PFV) | Difference |
|---|---|---|---|
| 766 | 191 | 187.1 | 3.9 |
| 745 | 189.4 | 184.5 | 4.9 |
| 720 | 186.5 | 181.4 | 5.1 |
| 695 | 183.4 | 178.1 | 5.3 |
| 670 | 180.3 | 174.4 | 5.9 |
| 645 | 176.8 | 170.6 | 6.2 |
| 620 | 173 | 167.9 | 5.1 |
| 595 | 169.9 | 164.1 | 5.8 |
| 570 | 166.5 | 160.4 | 6.1 |
| 560 | 165 | 158.9 | 6.1 |
| 550 | 163.5 | 157.4 | 6.1 |
| 540 | 162 | 155.9 | 6.1 |
| 529 | 160.4 | 154.2 | 6.2 |

1401

| Weight (x1000 lbs) | $VREF_{25}$ | $VREF_{25}$ (no PFV) | Difference |
|---|---|---|---|
| 766 | 180.2 | 177.3 | 2.9 |
| 745 | 179.5 | 174.8 | 4.7 |
| 720 | 176.7 | 171.7 | 5 |
| 695 | 173.7 | 168.5 | 5.2 |
| 670 | 170.6 | 165.3 | 5.3 |
| 645 | 167.4 | 162.1 | 5.3 |
| 620 | 164.2 | 158.7 | 5.5 |
| 595 | 160.9 | 155.3 | 5.6 |
| 570 | 157.5 | 151.8 | 5.7 |
| 560 | 156.1 | 150.4 | 5.7 |
| 550 | 154.7 | 148.9 | 5.8 |
| 540 | 153.3 | 147.4 | 5.9 |
| 529 | 151.8 | 145.8 | 6 |

1402

Fig. 14A

| Weight (x1000 lbs) | $VREF_{30}$ | $VREF_{30}$ (no PFV) | Difference |
|---|---|---|---|
| 766 | 181.4 | 175.8 | 5.6 |
| 750 | 179.6 | 173.4 | 6.2 |
| 740 | 178.1 | 171.7 | 6.4 |
| 730 | 176.6 | 169.7 | 6.9 |
| 720 | 175.1 | 167.6 | 7.5 |
| 710 | 173.5 | 165.6 | 7.9 |
| 700 | 171.9 | 163.6 | 8.3 |
| 690 | 169.9 | 161.7 | 8.2 |
| 680 | 167.8 | 160.4 | 7.4 |
| 670 | 165.8 | 159.2 | 6.6 |
| 660 | 163.8 | 157.9 | 5.9 |
| 650 | 161.8 | 156.6 | 5.2 |
| 640 | 160.5 | 155.3 | 5.2 |
| 630 | 159.3 | 152.9 | 6.4 |
| 620 | 158 | 150.5 | 7.5 |
| 610 | 156.8 | 148.8 | 8 |
| 600 | 155.5 | 147.4 | 8.1 |
| 590 | 153.1 | 146.1 | 7 |
| 580 | 150.7 | 144.8 | 5.9 |
| 570 | 148.9 | 143.4 | 5.5 |
| 560 | 147.6 | 142.1 | 5.5 |
| 550 | 146.3 | 140.7 | 5.6 |
| 540 | 144.9 | 139.3 | 5.6 |
| 529 | 143.8 | 137.8 | 6 |

1403

Fig. 14B

| FLAP POSITION | MANEUVER SPEED |
|---|---|
| FLAPS 0 | VREF30 + 80 |
| FLAPS 1 | VREF30 + 60 |
| FLAPS 5 | VREF30 + 40 |
| FLAPS 15 | VREF30 + 20 |
| FLAPS 20 | VREF30 + 20 |
| FLAPS 25 | VREF25 |
| FLAPS 30 | VREF30 |

1404

Fig. 14C

| Weight (1000Lbs) | Change in Airspeed from Loosing Phantom Fuel | | | | | | | |
|---|---|---|---|---|---|---|---|---|
| | 36000 | 34000 | 32000 | 30000 | 28000 | 26000 | 24000 | 22000 |
| 540 | -13 | -10 | -11 | -12 | -12 | -13 | -13 | -14 |
| 560 | -22 | -12 | -12 | -13 | -13 | -14 | -15 | -13 |
| 580 | | -11 | -9 | -8 | -10 | -10 | -11 | -11 |
| 600 | | -14 | -9 | -9 | -10 | -10 | -9 | -10 |
| 620 | | -12 | -9 | -11 | -9 | -9 | -11 | -10 |
| 640 | | -19 | -10 | -8 | -8 | -9 | -11 | -12 |
| 660 | | | -13 | -11 | -10 | -10 | -12 | -12 |
| 680 | | | -12 | -11 | -9 | -10 | -10 | -10 |
| 700 | | | -11 | -9 | -8 | -9 | -8 | -8 |
| 720 | | | -13 | -7 | -8 | -8 | -8 | -8 |
| 740 | | | | -10 | -9 | -9 | -10 | -11 |
| 760 | | | | -14 | -10 | -10 | -11 | -11 |

1405

Fig. 14D

| Weight (x1000lbs) | With PFV | Without PFV | Difference |
|---|---|---|---|
| 760 | 28200 | 29435 | 1235 |
| 740 | 28800 | 30130 | 1330 |
| 720 | 29400 | 30730 | 1330 |
| 700 | 30100 | 31335 | 1235 |
| 680 | 30700 | 32035 | 1335 |
| 660 | 31300 | 32735 | 1435 |
| 640 | 32000 | 33435 | 1435 |
| 620 | 32700 | 34135 | 1435 |
| 600 | 33400 | 34840 | 1440 |
| 580 | 34100 | 35640 | 1540 |
| 560 | 34800 | 36440 | 1640 |

1406

| Weight (x1000lbs) | With PFV | Without PFV | Difference |
|---|---|---|---|
| 760 | 31400 | 32325 | 925 |
| 740 | 31900 | 32825 | 925 |
| 720 | 32300 | 33300 | 1000 |
| 700 | 32800 | 33800 | 1000 |
| 680 | 33300 | 34300 | 1000 |
| 660 | 33800 | 34800 | 1000 |
| 640 | 34300 | 35400 | 1100 |
| 620 | 34800 | 35900 | 1100 |
| 600 | 35400 | 36500 | 1100 |
| 580 | 35900 | 37100 | 1200 |
| 560 | 36500 | 37800 | 1300 |

1407

Fig. 14E

METHOD, SYSTEM, AND COMPUTER-READABLE MEDIUM FOR CALIBRATING PERFORMANCE PARAMETERS OF AN AIRCRAFT DURING A PHANTOM FUEL PROCEDURE

RELATED APPLICATION DATA

This application claims priority to U.S. Provisional Application No. 63/507,748, filed Jun. 13, 2023, the disclosure of which is hereby incorporated by reference in its entirety.

FIELD

The present invention relates to a method, a system, and a computer-readable medium of an aircraft flight control system for calibrating performance parameters of an aircraft during a phantom fuel procedure.

BACKGROUND

The Zero Fuel Weight (ZFW) of an aircraft is the total weight of an aircraft and all its contents, omitting the total weight of the usable fuel on board, including engine injection fluid and other consumable propulsion fluids. The Maximum Zero Fuel Weight (MZFW) is the maximum ZFW weight that is allowed onboard a particular aircraft and is determined based on the specific aircraft structure and safety requirements. The calculation of a ZFW allows for determination of the maximum fuel capacity of an aircraft, as well as load management, flight planning, aerodynamics, fuel consumption, and performance.

Aircraft flight control systems will frequently hard-code the MZFW, such that a ZFW greater than the maximum cannot be entered by an operator into the Flight Management System (FMS) or Control Display Unit (CDU) of an aircraft. However, in some situations, it is possible to exceed the MZFW while maintaining operational and safety requirements of the aircraft. For example, an aircraft that is being repurposed from a passenger airplane into a freighter may be able to accommodate a greater ZFW due to a change in load distribution.

The problem in these cases is that the hard-coded MZFW limitations of the aircraft flight control system prevent entry of a ZFW higher than the MZFW. The ZFW is a component of the gross weight of the aircraft, and operation of the aircraft is dependent on an accurate assessment of gross weight. Therefore, entry of an incorrect ZFW due to the hard-coded MZFW limitations would undermine the safety and operational performance of the aircraft.

Accordingly, there is a need for methods and systems for accurately calibrating operational and safety parameters of an aircraft when operating the aircraft at greater than the MZFW.

SUMMARY

It is the object of the present invention to provide methods, systems, and computer-readable media for calibrating performance parameters of an aircraft that is being operated at greater than the MZFW. The disclosed methods, systems, and computer-readable media utilize a phantom fuel procedure that allows for utilizing a ZFW greater than the MZFW, while maintaining accurate determination of aircraft performance parameters and maintaining all fuel related aircraft subsystems.

This object is attained with a method, system, and computer-readable medium of an aircraft flight control system according to the present specification and in line with the present claims.

The present invention relates to a method executed by one or more computing devices of an aircraft flight control system for calibrating performance parameters of an aircraft during a phantom fuel procedure. The method can include the following steps, as discussed below.

The method includes determining an independent fuel weight parameter during operation of the aircraft value based at least in part on an output of one or more fuel level sensors of a fuel quantity subsystem communicatively coupled to the aircraft flight control system. The one or more fuel level sensors can be hardware sensors configured to detect a current fuel level in one or more fuel tanks of the aircraft.

The method includes receiving a zero fuel weight parameter value corresponding to a maximum allowable zero fuel aircraft weight via a control interface of the aircraft flight control system.

The method includes receiving a fuel weight parameter value corresponding to a weight of fuel onboard the aircraft and a phantom fuel value. The phantom fuel value can be an excess weight value of the aircraft beyond the maximum allowable zero fuel weight.

The method includes determining a gross weight parameter value based at least in part on the zero fuel weight parameter value and the fuel weight parameter value.

The method includes determining a fuel consumption parameter value of the aircraft based at least in part on an output of one or more fuel flow sensors communicatively coupled to the aircraft flight control system, the one or more fuel flow sensors comprising hardware sensors configured to detect a rate of fuel flow to one or more engines of the aircraft.

The method includes updating the gross weight parameter value during operation of the aircraft based at least in part on the fuel weight parameter value and the fuel consumption parameter value.

The method includes determining one or more performance parameter values for the aircraft during operation of the aircraft based at least in part on the gross weight parameter value, the one or more performance parameter values corresponding to one or more operational requirements of the aircraft.

The method can further include transmitting one or more instructions to one or more aircraft subsystems based at least in part on the one or more performance parameter values, the one or more aircraft subsystems being configured to adjust operation of the aircraft based at least in part on the one or more instructions.

The method can further include transmitting the performance parameter values on at least one display interface of one or more display interfaces of the aircraft flight control system.

The one or more performance parameters can include one or more of: a V-speed (such as approach, takeoff, and landing speeds), a maneuver margin, a fuel prediction, a holding speed, a flap retraction schedule, a flap extension schedule, a driftdown speed, a maximum altitude, an optimum altitude, a recommended altitude, a flap maneuver speed, an upper maneuver margin, a lower maneuver margin, a vertical navigation (VNAV) parameter, a climb speed, and/or position reports.

The method can further include transmitting the independent fuel weight parameter value on at least one display interface of one or more display interfaces of the aircraft flight control system.

The method can further include updating the fuel weight parameter value during operation of the aircraft based at least in part on the fuel consumption parameter value, updating a minimum fuel weight parameter value based at least in part on the phantom fuel value, and transmitting an insufficient fuel warning on at least one display interface of one or more display interfaces of the aircraft flight control system based at least in part on a determination that the fuel weight parameter value is less than the minimum fuel weight parameter value.

The method can further include detecting a phantom fuel void condition and setting the fuel weight parameter to be equal to the independent fuel weight parameter based at least in part on detecting the phantom fuel void condition. The step of detecting a phantom fuel void condition can include one or more of detecting an invalid fuel flow signal from at least one of the one or more one or more fuel flow sensors and/or detecting initiation of a fuel jettison procedure. When detecting a phantom fuel void condition at least one of the one or more performance parameters determined by the aircraft flight control system are adjusted to account for the excess weight.

The method can further include transmitting a fuel-related warning on at least one display interface of one or more display interfaces of the aircraft flight control system and transmitting one or more fuel-related parameters on at least one display interface of the one or more display interfaces of the aircraft flight control system. The one or more fuel-related parameters can be configured to allow an operator of the aircraft to determine whether a fuel leak is a cause of the fuel-related warning. The fuel-related warning can be a fuel disagree warning, an insufficient fuel warning, a fuel imbalance warning, and/or a low fuel quantity warning.

The present invention additionally relates to an aircraft flight control system (referred to herein as the "system," the "flight management system," and/or the "FMS") for calibrating performance parameters of an aircraft during a phantom fuel procedure. The aircraft flight control system can comprise one or more processors and one or more memories operatively coupled to at least one of the one or more processors and having instructions stored thereon that, when executed by at least one of the one or more processors, cause at least one of the one or more processors to perform one or more of the above-mentioned method steps.

The present invention additionally relates to at least one non-transitory computer-readable medium storing computer-readable instructions that, when executed by an aircraft flight control system, cause the aircraft flight control system to perform one or more of the above-mentioned method steps.

BRIEF DESCRIPTION OF THE DRAWINGS

FIGS. 14A-14E illustrate tables used for adjustment of performance parameters in the event of loss of the phantom fuel value and cancellation of the phantom fuel procedure according to an exemplary embodiment.

DETAILED DESCRIPTION

Figure 1:
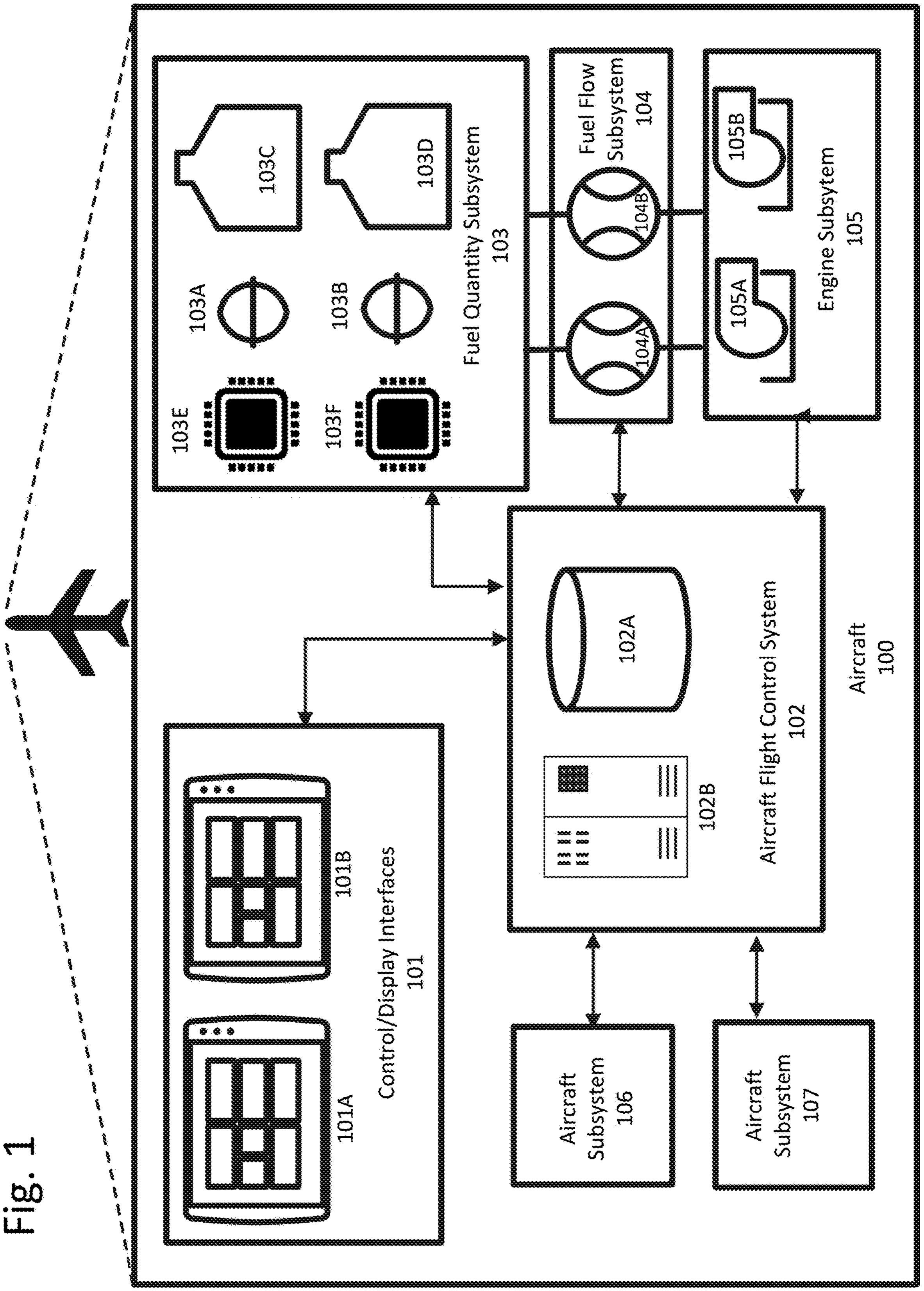
FIG. 1 illustrates various aircraft components and aircraft subsystems, including an aircraft flight control system, according to an exemplary embodiment.

While methods, systems, and computer-readable media are described herein by way of examples and embodiments, those skilled in the art recognize that methods, systems, and computer-readable media for calibrating performance parameters of an aircraft during a phantom fuel procedure are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

As explained above, many aircraft flight control systems have a hard-coded MZFW that does not allow operators to enter a ZFW that is greater than the maximum. This is a problem in the scenarios where the aircraft can accommodate a greater ZFW than the MZFW, since the inability to store a ZFW greater than the MZFW limits efficient utilization of the aircraft. Furthermore, since the ZFW is a key parameter in determination of gross weight of the aircraft and is utilized to determine performance parameters of the aircraft, an incorrect ZFW will have downstream effects, in terms of safe and efficient operation of the aircraft.

Applicant has discovered a phantom fuel procedure and a method, system, and computer-readable medium for calibrating performance parameters of an aircraft during a phantom fuel procedure that allows for utilization of a MZFW that is greater than the ZFW.

The disclosed systems and methods ensure that the gross weight utilized by the aircraft flight control system for determination of performance parameters remains accurate, even when operating with a ZFW that is greater than a MZFW limit hard-coded into the aircraft flight control system.

The disclosed systems and methods utilize a phantom fuel procedure that stores the excess weight of the aircraft beyond the MZFW as a fuel weight. This excess weight is referred to as "phantom fuel weight," since it does not correspond to fuel. This total fuel weight is then used by the aircraft flight control system to correctly determine and utilize a gross weight of the aircraft for calculation of performance parameters and operation of the aircraft. At the same time, independent sets of sensors onboard the aircraft are used to ensure accurate tracking of the actual amount of fuel on the plane and the rate of fuel burn of the aircraft. Fuel-related warning subsystems are also updated to ensure that fuel-related warnings are adjusted to account for phantom fuel weight. In this way, the present system and method allows for utilization of a ZFW greater than the MZFW without compromising operational requirements of the aircraft and while accurately tracking fuel-relating subsystems.

FIG. 1 illustrates various aircraft components and aircraft subsystems, including an aircraft flight control system, according to an exemplary embodiment. The aircraft can be, for example, a 777-200LR aircraft, which has a hard-coded MZFW limit that does not permit entry of a ZFW greater than 500,000 pounds. The aircraft can also be another aircraft, such as a commercial airline or a freight/cargo aircraft.

The aircraft 100 includes one or more control and/or display interfaces 101, such as interface 101A and 101B. These interfaces can include a Control Display Unit (CDU), a Primary Flight Display (PFD), an Engine Indicating and Crew Alerting System (EICAS), or other interfaces. The interfaces can include one or more output interfaces, such as display screens and/or physical, visual, or audible indicators, such as numbers, lights, or speakers. The interfaces can also include one or more input interfaces, such as a touchscreen, a keyboard, a mouse or other pointing device, or physical buttons, switches, or knobs. Although this application refers to control interfaces and display interfaces, it is understood that a display interface can also be a control interface and vice versa. Additionally, the interfaces 101 can include one or more dedicated display interfaces and one or more combined control/display interfaces.

The aircraft 100 further includes a fuel quantity subsystem 103 that is configured to independently determine a fuel quantity onboard the aircraft. The fuel quantity subsystem can be, for example, a fuel quantity indicating system (FQIS). The fuel quantity subsystem can include one or more fuel tanks, such as tanks 103C and 103D, one or more fuel level sensors, such as fuel level sensors 103A and 103B, and one or more processors, such as processors 103E and 103F. The fuel level sensors 103A and 103B are configured to measure a fuel level remaining in the fuel tanks 103C and 103D and provide output, in the form of measurements and/or levels to processors 103E and 103F. The processors can then interpret and/or analyze the inputs from the sensors to determine a quantity of fuel remaining in each of the fuel tanks and the total remaining fuel onboard the aircraft. The remaining fuel quantity can then be transmitted by the fuel quantity subsystem 103 to the aircraft flight control system 102. Optionally, the processors can be omitted from the fuel quantity subsystem and the output of the fuel level sensors can be sent directly to the aircraft flight control system 102. In either case, the fuel level sensors are communicatively coupled to the aircraft flight control system 102 and configured to provide an output that is used to determine a remaining fuel weight.

The fuel level sensors 103A and 103B are hardware sensors and can include any combination of electrical, mechanical, and/or software components. The fuel level sensors can be, for example, ultrasonic sensors that detect a fuel level of fuel in each tank based on ultrasonic sound waves reflected from the fuel. The fuel level sensors can also be, for example, lidar sensors that measure reflected light from the fuel to image the fuel level in the fuel tanks and determine a quantity of fuel remaining. Additionally, the fuel level sensors can be fuel float sensors that measure fuel levels using a potentiometer connected to a float.

The aircraft 100 additionally includes a fuel flow subsystem 104 that can include one or more fuel flow sensors, such as fuel flow sensors 104A and 104B, and an engine subsystem 105, including one or more engines, such as engines 105A and 105B. Each of the fuel flow sensors can detect a fuel flowing from fuel tanks, such as tanks 103C and 103D, to each of the engines and burned by each of the engines during operation of the aircraft. The output of the fuel flow sensors 104A and 104B is provided to the aircraft flight control system 102. This output can be used by the aircraft flight control system 102 to determine a rate of fuel flow to each engine and/or a total fuel burn. Alternatively, the fuel flow sensors can include onboard software or hardware configured to determine a rate of fuel flow and can communicate this output to the aircraft flight control system 102.

The fuel flow sensors, such as fuel flow sensors 104A and 104B, are hardware sensors and can include any combination of electrical, mechanical, and/or software components that determine a rate of fuel flow from the fuel tanks to the aircraft engines. The fuel flow sensors can be, for example, mass flow meters, velocity flow meters, pressure differential meters, positive displacement meters, and/or electromagnetic flow meters.

The engine subsystem 105 of the aircraft 100 includes one or more engines, such as engines 105A and 105B. The aircraft engines are part of the aircrafts propulsion system and can be, for example, piston engines, gas turbine engines, and/or jet engines.

The aircraft 100 includes an aircraft flight control system 102 which is responsible for a variety of functions, as will be described in greater detail below. The aircraft flight control system can include one or more data stores, such as data store 102A. Data stores can be any kind of storage medium, such as a server, hard drive, memory, or other computer-readable medium that stores parameters and other information necessary to operate the aircraft. The aircraft flight control system 102 also includes one or more flight computers, such as flight computer 102B, which can perform calculations or determine parameters, trajectories, or other values necessary to operate the aircraft.

The aircraft flight control system 102 is configured to communicate with the fuel quantity subsystem 103, the fuel flow subsystem 104, and the engine subsystem 105. The aircraft flight control system 102 can also communicate with one or more other aircraft subsystems, such as aircraft subsystems 106 and 107. Aircraft subsystems 106 and 107 are shown only to illustrate that the aircraft flight control system 102 communicates with additional subsystems. It is understood that the aircraft subsystems in communication with the aircraft can include additional and/or alternative subsystems not presented in the figure, such as software subsystems, landing gear subsystems, hydraulic subsystems, electrical subsystems, engine bleed air subsystems, avionics subsystems, cabin control subsystems, additional fuel subsystems, additional propulsion subsystems, anti-icing systems, or other aircraft subsystems.

Additionally, the aircraft flight control system 102 communicates with control/display interfaces 101 and can receive information provided by operators via control/display interfaces 101 and transmit information for display by control/display interfaces.

Figure 2:
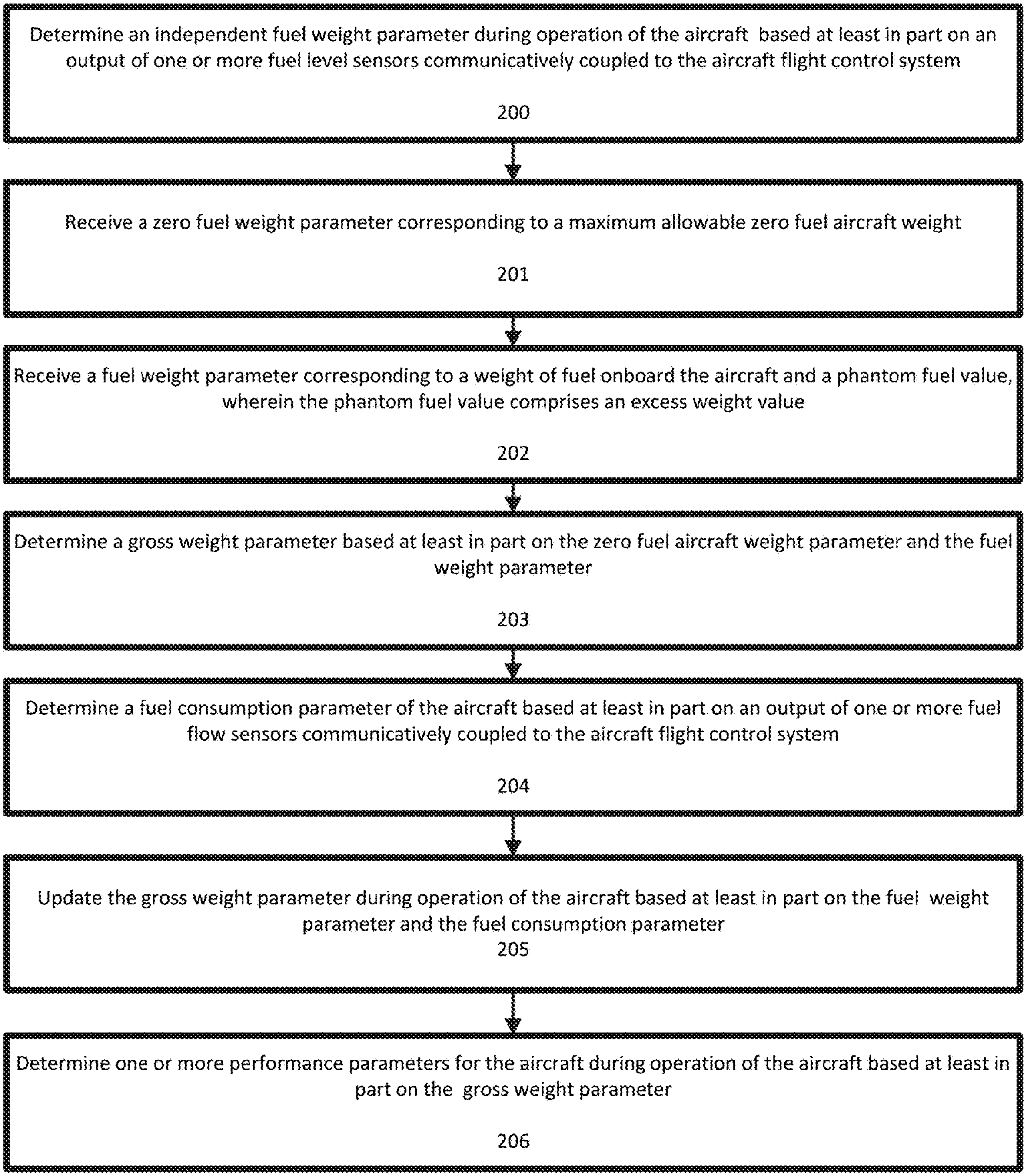
FIG. 2 illustrates a flowchart for calibrating performance parameters of an aircraft during a phantom fuel procedure.

FIG. 2 illustrates a flowchart for calibrating performance parameters of an aircraft during a phantom fuel procedure. Each of the steps in the flowchart can be performed by an aircraft flight control system, such as the one described above and throughout this application.

At step 200 an independent fuel weight parameter is determined during operation of the aircraft value based at least in part on an output of one or more fuel level sensors of a fuel quantity subsystem communicatively coupled to the aircraft flight control system. As discussed with respect to FIG. 1, the one or more fuel level sensors can be hardware sensors configured to detect a current fuel level in one or more fuel tanks of the aircraft.

The independent fuel weight parameter that is determined based on the output of the fuel level sensors is independent of the fuel weight entered into the aircraft flight control system by the operator, as will be described in greater detail below. Since the fuel quantity subsystem independently measures the fuel level remaining in each of the tanks, the independent fuel weight parameter always stores an accurate value for the fuel remaining in each of the tanks.

When the aircraft is first started, the independent fuel weight parameter value can be used to populate the fuel weight parameter, prior to editing or modification by the user as part of the phantom fuel procedure. Specifically, at engine start, the aircraft flight control system can determine a value for the initial fuel weight parameter based on the output of the fuel level sensors at that initial point.

The independent fuel weight parameter value can be updated throughout the flight and throughout operation of the aircraft. This updating is performed based on the current output of fuel level sensors, which can be interpreted by processors in the fuel quantity subsystem and/or directly passed to the aircraft flight control system. This updating can be performed continuously or periodically on an intermittent basis. For example, the gross weight parameter value can be updated every millisecond, every second, every 30 seconds, or some other interval.

Figure 3:
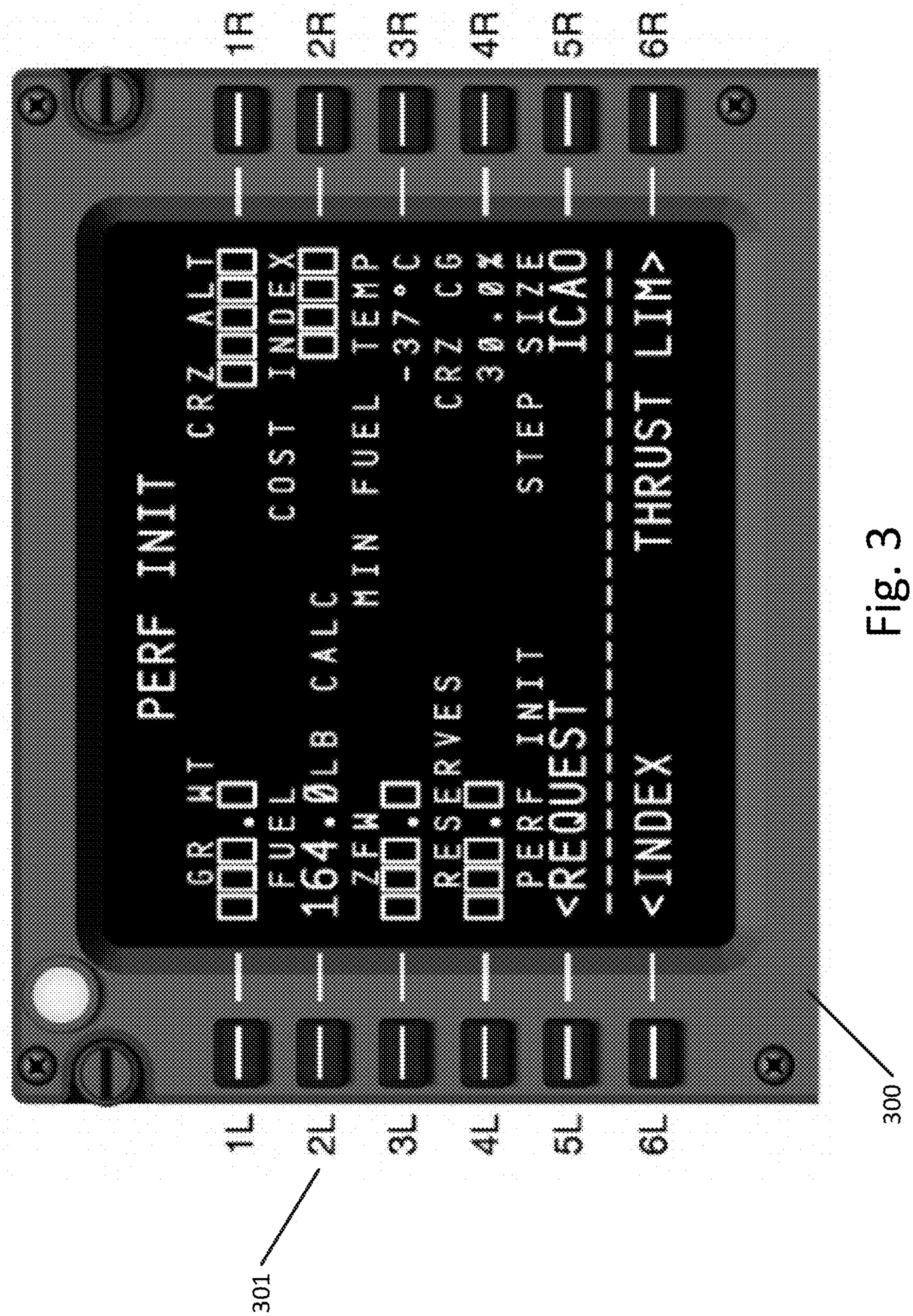
FIG. 3 illustrates a control/display interface for displaying an initial fuel weight measurement according to an exemplary embodiment.

FIG. 3 illustrates a control/display interface for displaying an initial fuel weight measurement according to an exemplary embodiment. The control/display interface 300 can be one of the control/display interfaces 101 described with respect to FIG. 1, such as the control display unit (CDU). As shown in FIG. 3, the control/display interface 300 is initialized with several parameters that are initially blank. However, the fuel weight parameter value 301 is initialized to 164.0 pounds. This initial fuel weight parameter value can be determined based on the output of the fuel level sensors, which detect the initial fuel levels in the fuel tanks and provide that information to the aircraft flight control system.

Returning to FIG. 2, at step 201 a zero fuel weight parameter value corresponding to a maximum allowable zero fuel aircraft weight (i.e., the MZFW) is received via a control interface of the flight control system. As discussed previously the present system allows for operation of an aircraft above the MZFW when the system is hard coded to prevent entry of a ZFW above the MZFW. As an initial step, the operator can enter the highest possible value for the ZFW allowable by the flight control system. For example, if the MZFW of the aircraft is 500K pounds and the actual ZFW of the aircraft is 543K pounds, the operator would enter 500K pounds into the control interface of the flight control system.

Figure 4:
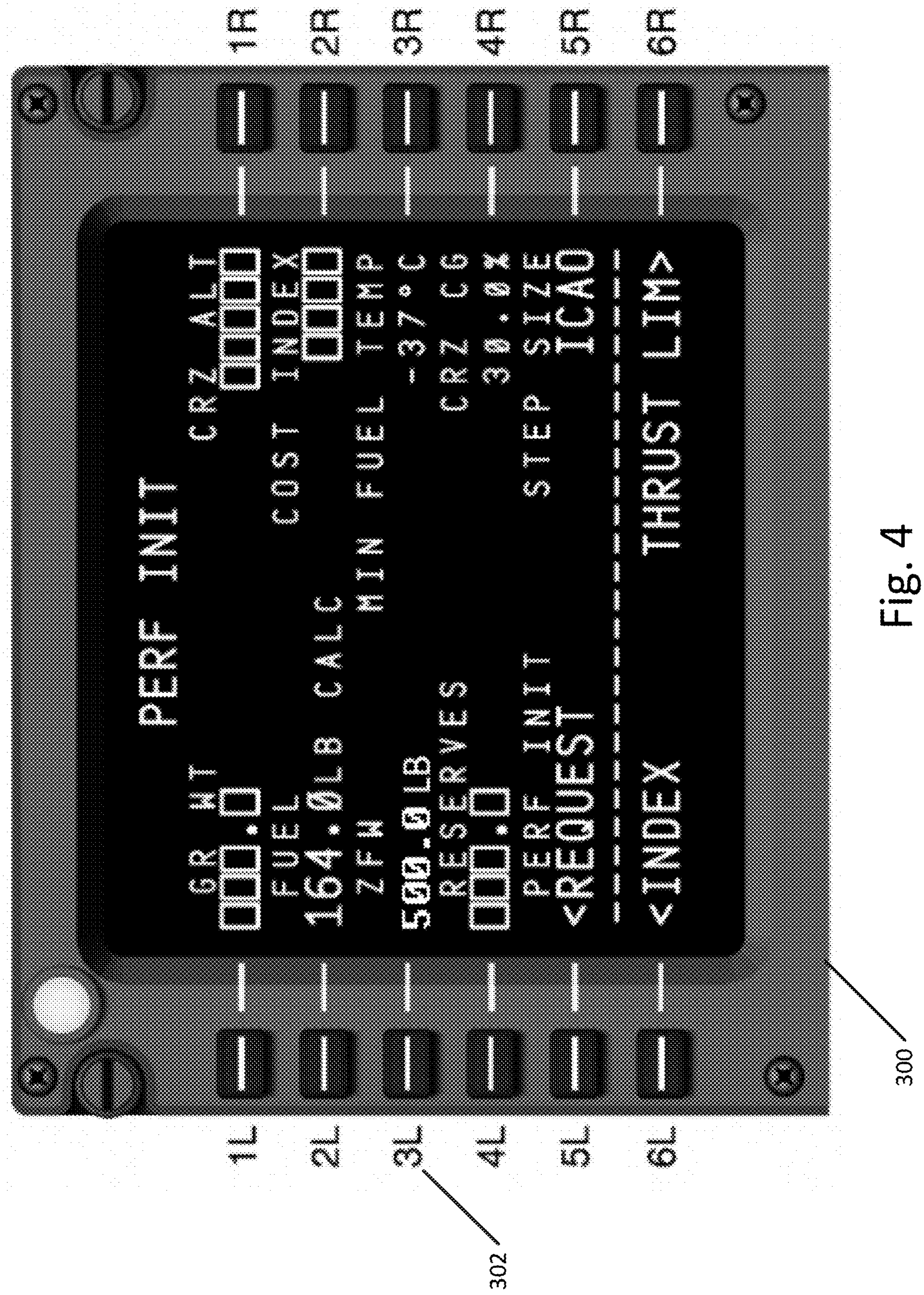
FIG. 4 illustrates a control/display interface for entering a ZFW according to an exemplary embodiment.

FIG. 4 illustrates a control/display interface for entering a ZFW according to an exemplary embodiment. The control/display interface 300 is the same interface that is shown in FIG. 3. As shown in FIG. 4, the operator has entered a zero fuel weight parameter value 302 of 500.0. Although not shown in the interface, it is understood that all units are in thousands of pounds. Therefore, the operator has entered a ZFW of 500,000 pounds, corresponding to the MZFW of the aircraft in this example.

At step 202 a fuel weight parameter value is received via the control interface of the flight control system that corresponds to a weight of fuel onboard the aircraft and a phantom fuel value. The phantom fuel value is an excess weight value corresponding to an amount by which the actual ZFW of the aircraft exceeds the MZFW. The operator can combine the fuel weight detected by the fuel quantity subsystem (i.e., the independent fuel weight parameter value) with the phantom fuel value and enter the combined sum as the fuel weight parameter value in this step. For example, if the actual ZFW of the aircraft is 543K pounds and the MZFW entered in step 201 is 500K pounds, then the phantom fuel value would be 43K pounds. The operator would then add 43K pounds to the weight of the fuel detected by the fuel quantity subsystem and enter the sum into the control interface.

Figure 5A:
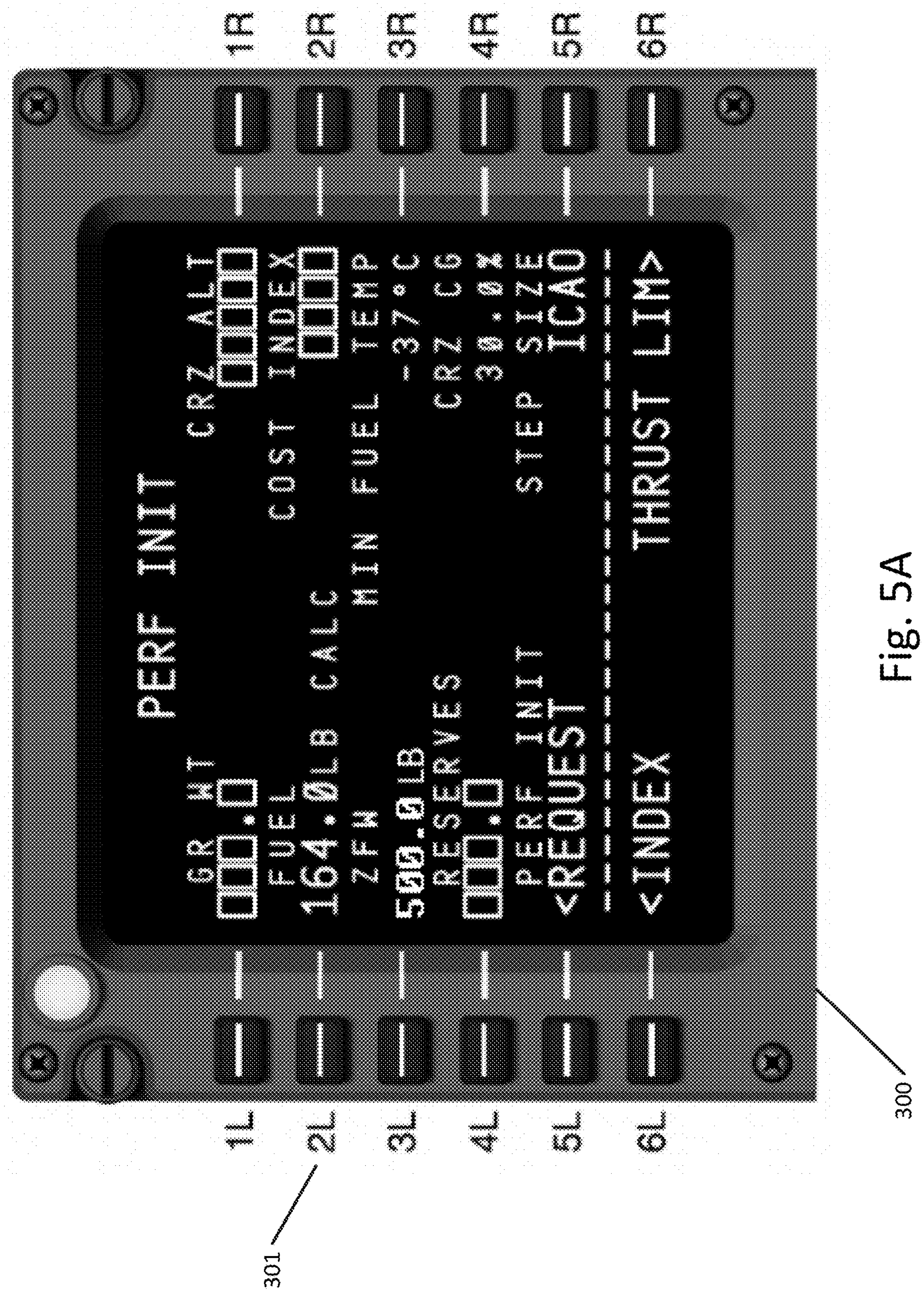
FIGS. 5A-5B illustrate a control/display interface for entering a fuel weight parameter value including the phantom fuel value according to an exemplary embodiment.
Figure 5B:
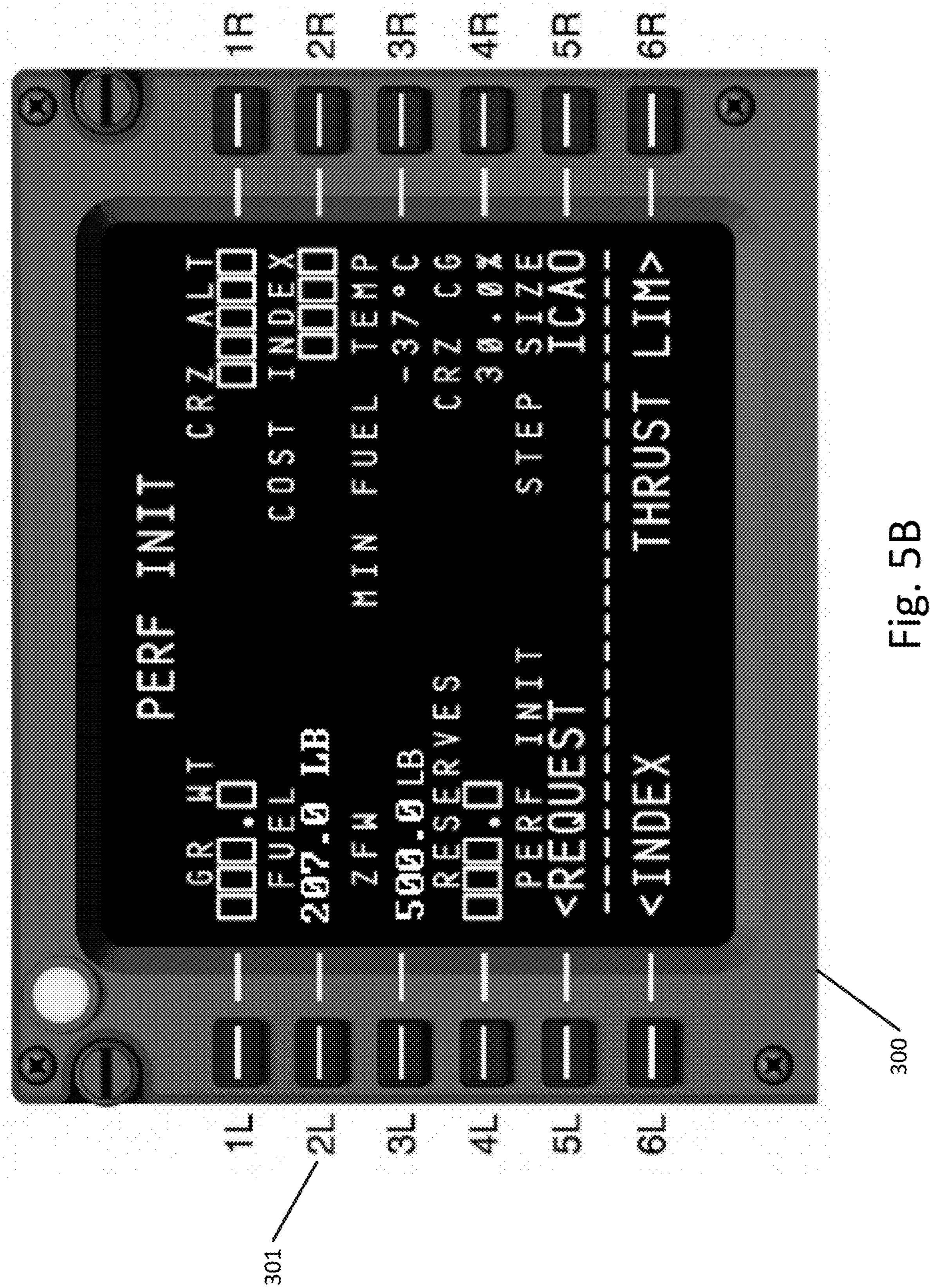

FIGS. 5A-5B illustrate a control/display interface for entering a fuel weight parameter value including the phantom fuel value according to an exemplary embodiment. The interface 300 shown in FIGS. 5A-5B is the same interface shown in FIGS. 3-4. As shown in FIG. 5A, the fuel weight parameter value 301 populated in the interface is initially set to 164K pounds, corresponding to the independent fuel parameter value as determined by the fuel quantity subsystem, and the ZFW entered is 500K pounds. Assuming that that the actual ZFW of the aircraft is 543K pounds, then the user would add the phantom value of 43K pounds to the initially determined fuel weight parameter value of 164K, resulting in 207K pounds. FIG. 5B illustrates the operator entering 207K pounds as the fuel weight parameter value 302 in the interface 300. The operator can optionally enter this value by selecting a fuel weight manual override option in the interface. Ordinarily, if the actual ZFW is less than the MZFW, the phantom fuel procedure is not required, and the operator can simply accept the initially determined fuel weight parameter value.

Returning to FIG. 2, at step 203 a gross weight parameter value is determined based at least in part on the zero fuel weight parameter value and the fuel weight parameter value.

The gross weight parameter value is the sum of the ZFW parameter value entered in step 201 and the fuel weight parameter value entered in step 202. Since the fuel weight parameter value entered in step 202 incorporates the excess weight over the entered ZFW parameter value as a phantom fuel value, the gross weight parameter value accurately reflects the correct gross weight of the aircraft and the fuel. This ensures that all calculations, projections, and flight parameters determined by the aircraft flight control systems are accurate.

Figure 6:
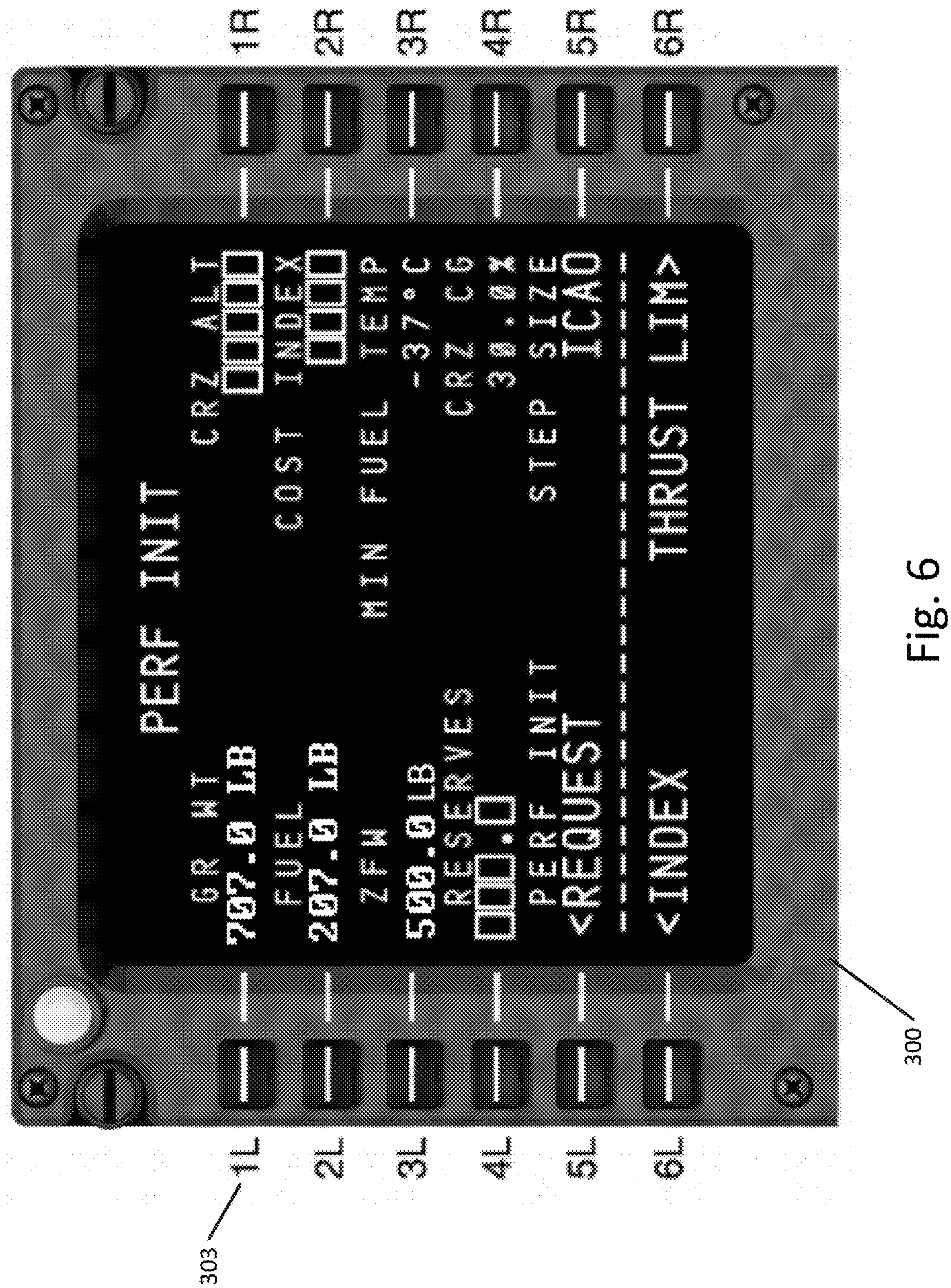
FIG. 6 illustrates a control/display interface displaying the determined gross weight parameter value according to an exemplary embodiment.

FIG. 6 illustrates a control/display interface displaying the determined gross weight parameter value according to an exemplary embodiment. The interface 300 is the same interface shown in previous FIGS. 3-4 and 5A-5B. As shown in FIG. 6, the gross weight parameter value 303 of 707K pounds is the sum of the fuel weight parameter value (207K pounds) and the entered ZFW parameter value (500K pounds).

Although the correct gross weight is determined in steps 200-203, the aircraft flight control system must continuously track actual fuel usage during operation of the aircraft and correctly determine the actual fuel remaining in the aircraft while also correctly tracking a current gross weight of the aircraft based on the fuel weight parameter value that incorporates the phantom fuel value. The present system accomplishes this by utilizing a set of sensors independent of the fuel level sensors to track fuel consumption and determining a fuel consumption parameter value. As explained in greater detail below, the fuel consumption parameter value determined based on fuel flow sensors is used to adjust the fuel weight parameter value and ensure a correct current gross weight parameter value. At the same time, the independent fuel weight parameter value determined based on the output of the fuel level sensors continues to give the operator an accurate value for remaining fuel. Additionally, the independent fuel weight parameter is segregated from the fuel parameter value and only the fuel parameter value is used for performance parameter calculations to ensure correct determination of performance parameters.

Returning to FIG. 2, at step 204 a fuel consumption parameter value of the aircraft is determined based at least in part on an output of one or more fuel flow sensors communicatively coupled to the aircraft flight control system, wherein the one or more fuel flow sensors comprise hardware sensors configured to detect a rate of fuel flow to one or more engines of the aircraft. As discussed with respect to FIG. 1, the fuel flow sensors can include hardware and/or software to determine a current rate of flow to each engine. The fuel flow sensors can then provide this information to the aircraft flight control system 102, which can store and/or tabulate the total fuel used across different engines.

At step 205 the gross weight parameter value is updated during operation of the aircraft based at least in part on the fuel weight parameter value and the fuel consumption parameter value. As discussed previously, the fuel weight parameter value incorporates the phantom fuel weight. Therefore, the fuel weight parameter cannot be set based upon the independent fuel weight parameter value determined based on output from the fuel level sensors, because the independent fuel weight parameter value corresponds to an actual amount of fuel remaining, not including the phantom fuel value. Additionally, some aircraft do not permit a manual override of the fuel weight parameter value after takeoff, making it impossible to adjust the fuel weight parameter value based on changes to the independent fuel weight parameter value. The fuel consumption parameter value across one or more engines can be deducted from a current fuel weight parameter value to determine an updated the fuel weight parameter value. This updated fuel weight parameter value can then be combined with the ZFW parameter value to determine an updated gross weight parameter value. The gross weight parameter value can be updated continuously or periodically on an intermittent basis. For example, the gross weight parameter value can be updated every millisecond, every second, every 30 seconds, or some other interval.

At step 206 one or more performance parameter values for the aircraft are determined during operation of the aircraft based at least in part on the gross weight parameter value, the one or more performance parameter values corresponding to one or more operational requirements of the aircraft. The gross weight of an aircraft is critical to determine performance parameters of the aircraft, and the present system ensures accuracy by incorporating the phantom fuel value into the gross weight, as discussed above. The performance parameter values can also be determined based on other parameters or inputs, such as atmospheric variables, altitude, aircraft position, or other values.

The performance parameters can include, for example, a V-speed, a maneuver margin, a fuel prediction, an approach speed, a holding speed, a flap retraction schedule, a flap extension schedule, a driftdown speed, a maximum altitude, an optimum altitude, a recommended altitude, a takeoff speed, a landing speed, a flap maneuver speed, an upper maneuver margin, a lower maneuver margin, a vertical navigation (VNAV) parameter, a climb speed, and/or an aircraft position. All of these performance parameters are impacted by the current gross weight of the aircraft.

FIGS. 7A-7G illustrate the operation of the steps described in FIG. 2 with respect to the aircraft components and aircraft subsystems shown in FIG. 1 according to an exemplary embodiment. Although various figures in FIGS. 7A-7E do not illustrate every component shown in FIG. 1, this omission is for clarity of illustration only, and it is understood that the components shown in FIG. 1 are still present in FIGS. 7A-7E.

Figure 7A:
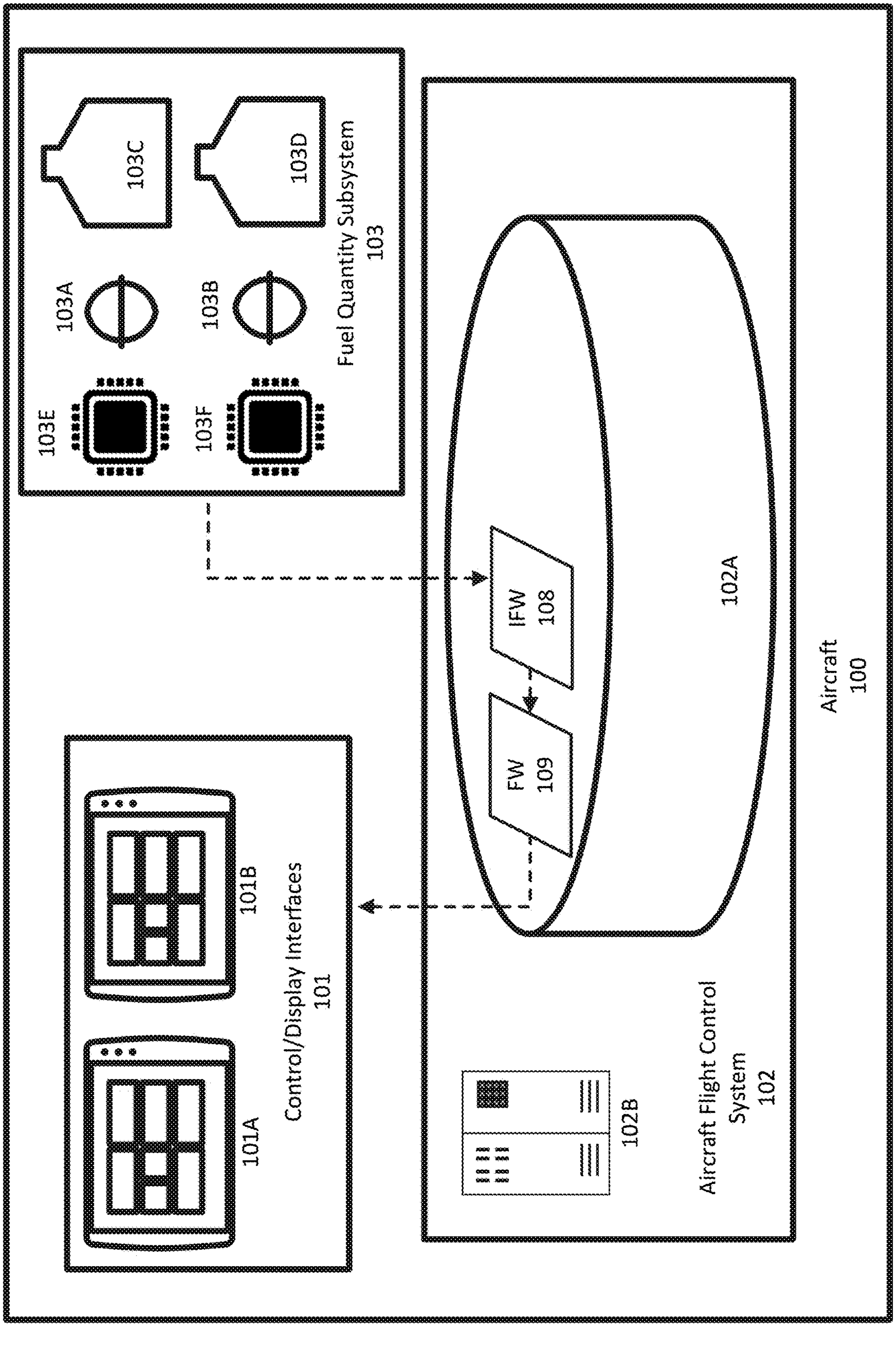
FIGS. 7A-7G illustrate the operation of the steps described in FIG. 2 with respect to the aircraft components and aircraft subsystems shown in FIG. 1 according to an exemplary embodiment.

As shown in FIG. 7A, upon initial activation of the aircraft engine, the fuel quantity subsystem 103 determines an independent fuel weight (IFW) parameter value 108, as described previously with respect to step 200 in FIG. 2. The IFW parameter value 108 is then sent to the aircraft flight control system 102. The IFW parameter value 108 is stored in the data store 102A of the aircraft flight control system and is initially used to populate a fuel weight (FW) parameter value 109. The FW parameter value 109 is then sent to the control/display interfaces and then displayed as an initial fuel weight, as shown in FIG. 3. Although not shown in subsequent figures, it is understood that the IFW parameter value 108 is continuously or periodically updated by the fuel quantity subsystem 103 during operation of the aircraft.

Figure 7B:
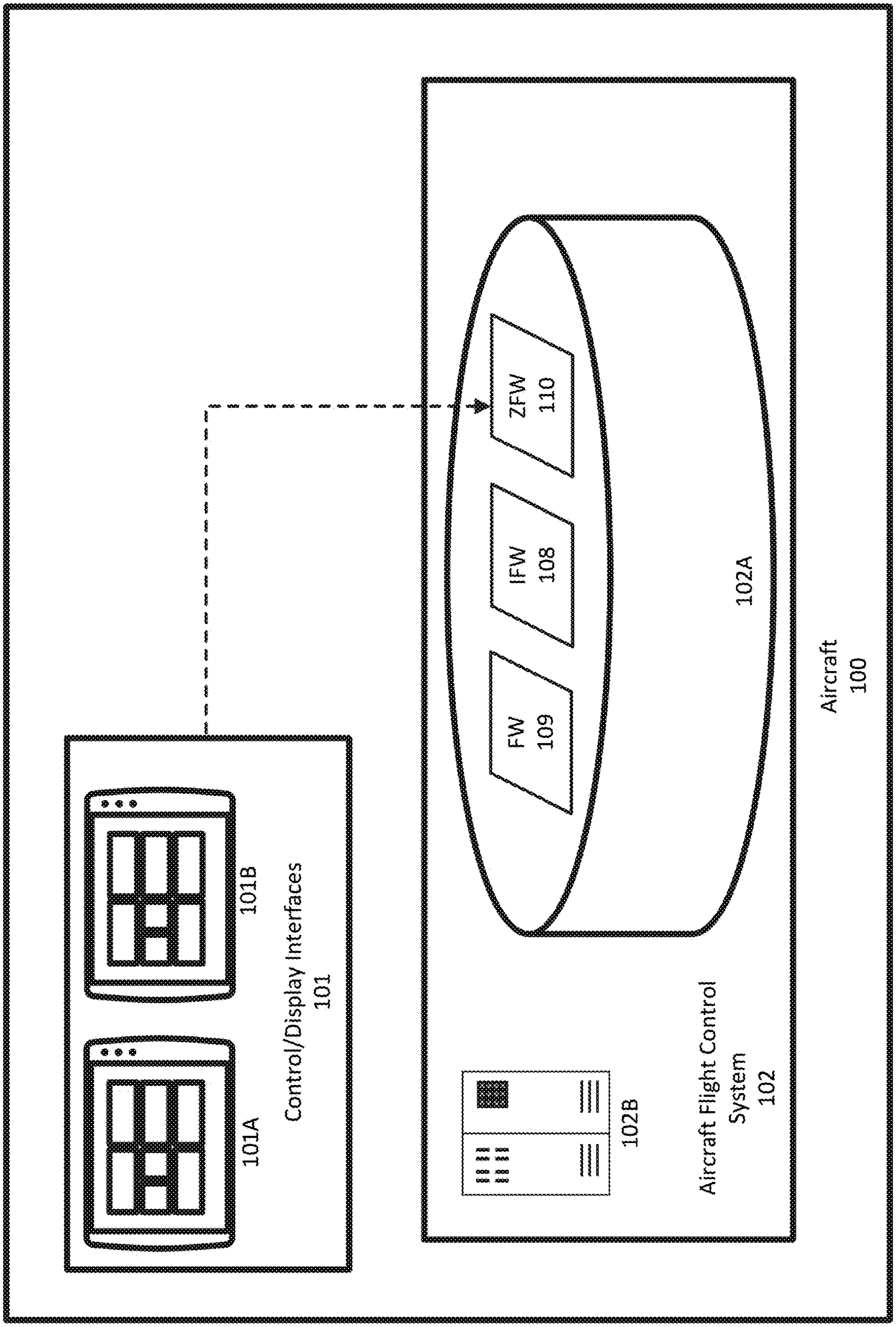

Turning to FIG. 7B, an operator enters a ZFW parameter value 110 into control/display interfaces 101, as explained with reference to step 201 of FIG. 2. The ZFW parameter 110 value is then sent to the aircraft flight control system 102 and stored in the data store 102A.

Figure 7C:
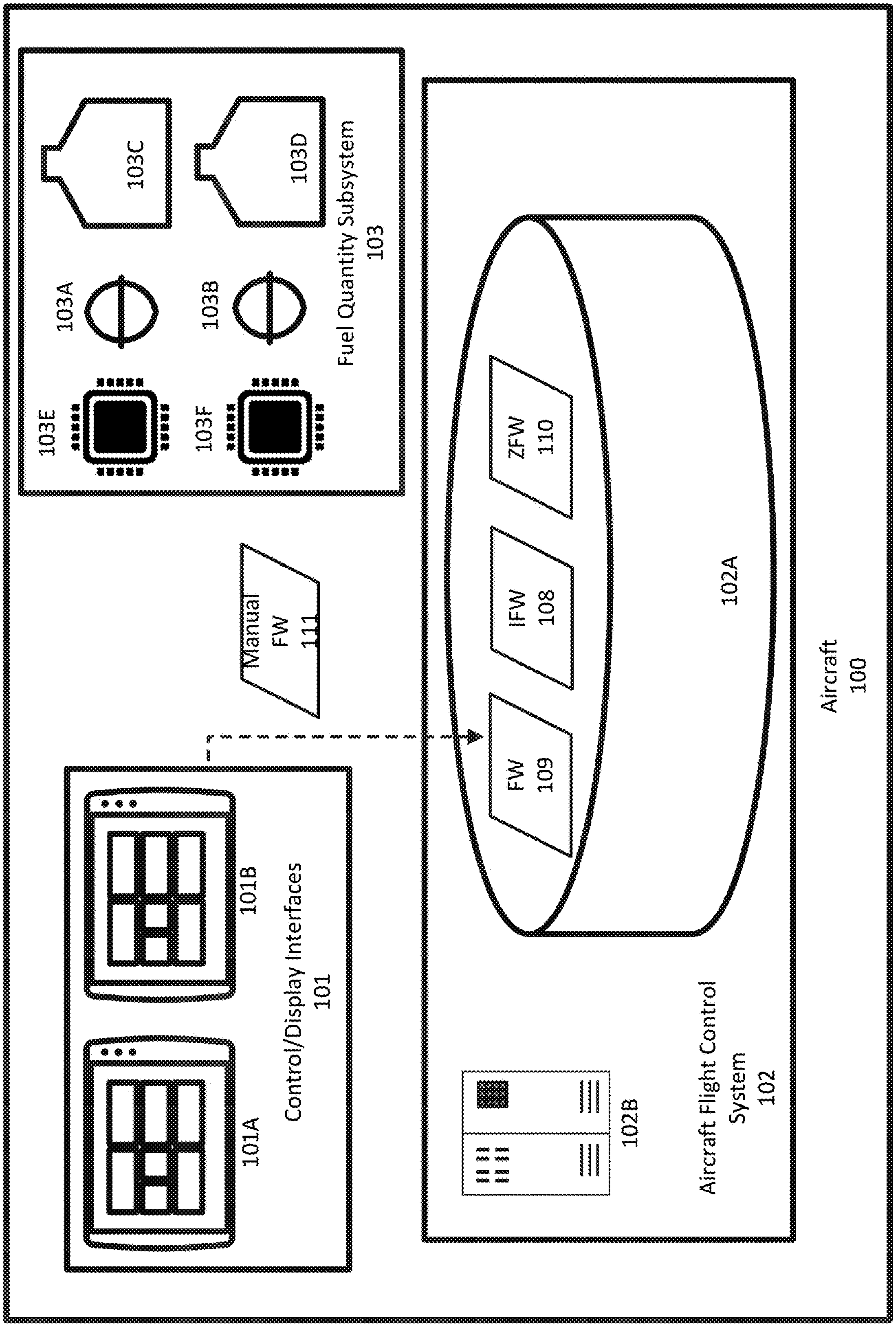

FIG. 7C corresponds to step 202 of FIG. 2. As shown in FIG. 7C, an operator selects an option to manually override an initially determined fuel weight parameter value and manually enters a fuel weight (FW) parameter value 111 that includes the phantom fuel weight incorporating excess ZFW weight. The manual FW parameter value 111 is then sent to the aircraft flight control system 102, where it overwrites the previous FW parameter value 109 stored in the data store 102A. At the stage shown in FIG. 7C, the data store 102 includes a fuel weight parameter value 109 corresponding to the actual fuel weight and the phantom fuel value, an independent fuel weight parameter value 108 corresponding to the fuel level detected by the fuel quantity subsystem 103, and the ZFW parameter value provided by the operator, which corresponds to a MZFW permitted by the aircraft flight control system.

Figure 7D:
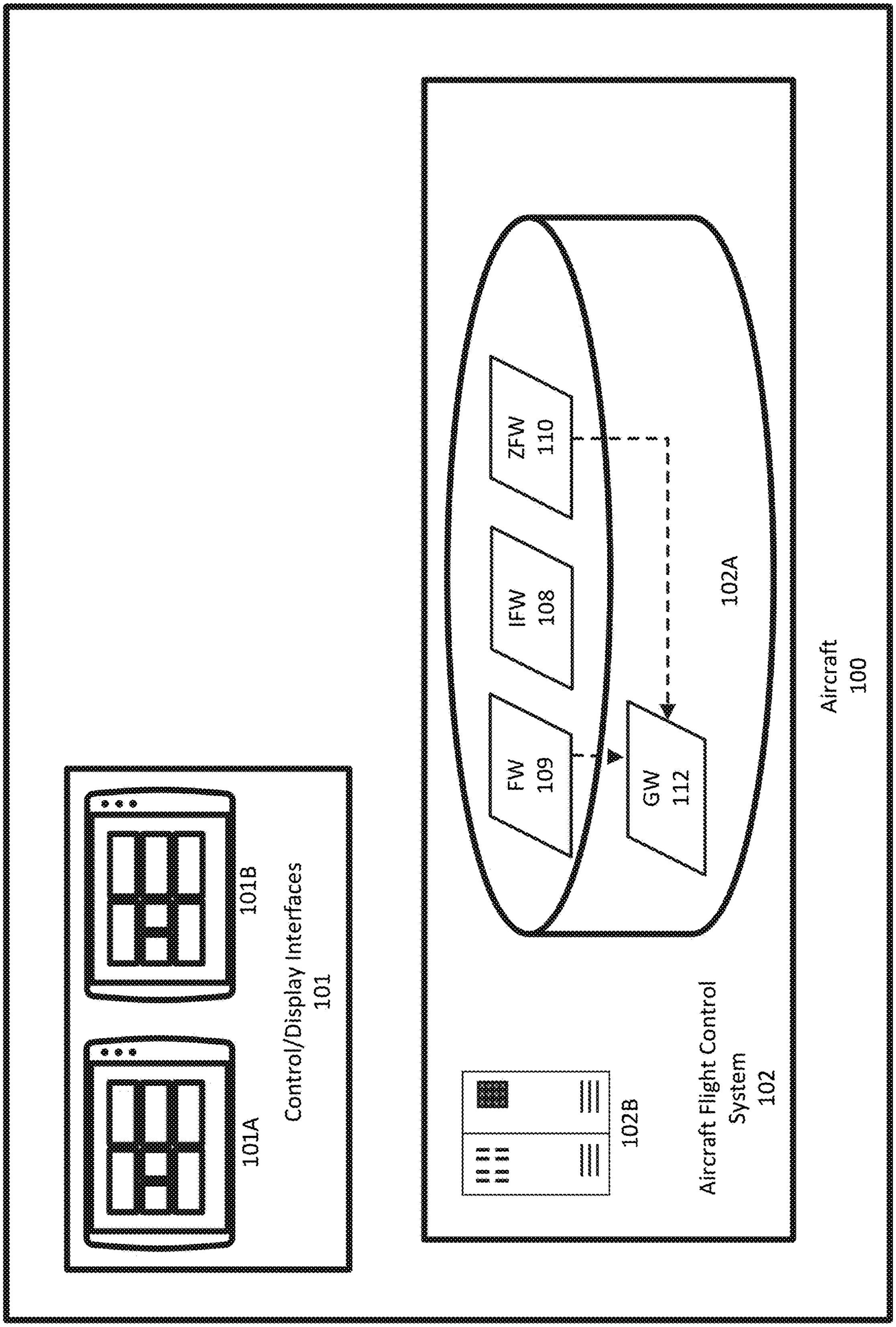

FIG. 7D corresponds to step 203 of FIG. 2. As shown in this figure, the ZFW parameter value 110 and the FW parameter value 109 are selectively used to determine the gross weight (GW) parameter value 112. This system utilizes the FW parameter value 109 instead of the IFW parameter value 108 to ensure that the phantom fuel value is accounted for in the gross weight, which is critical to accurate determination of performance parameters.

Figure 7E:
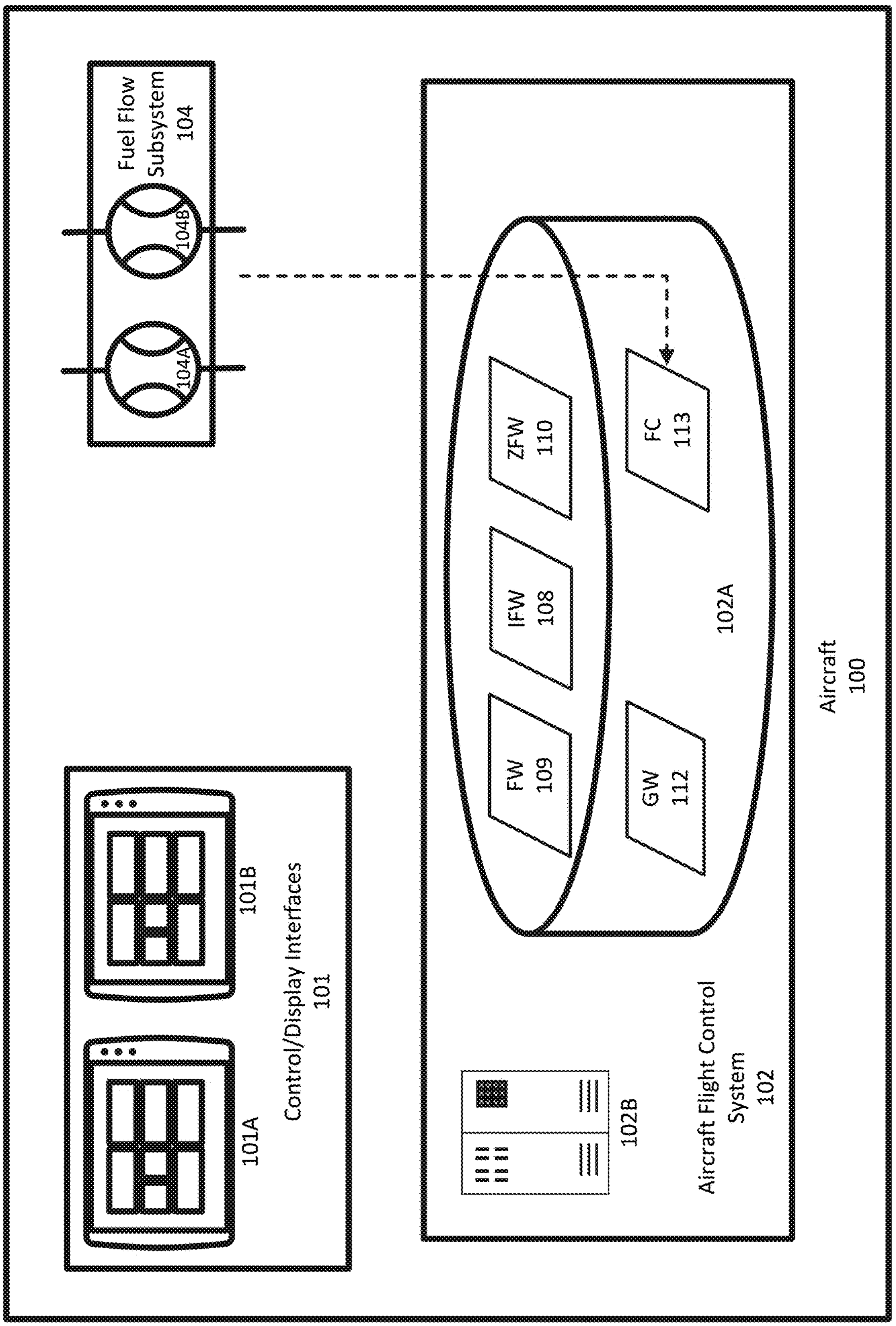

FIG. 7E corresponds to step 204 of FIG. 2. The output of the fuel flow subsystem 103 and fuel flow sensors 104A and 104B is used to determine a fuel consumption (FC) parameter value 113, which can be stored in the data store 102A of aircraft flight control system 102. The FC parameter value can include a rate of change, a decrease over a period of time, and/or a total amount of fuel consumed, and can be indicated for each engine and tallied across engines. Although not shown in subsequent figures, it is understood that the FC parameter value 113 is continuously or periodically updated by the fuel flow subsystem 104 during operation of the aircraft.

Figure 7F:
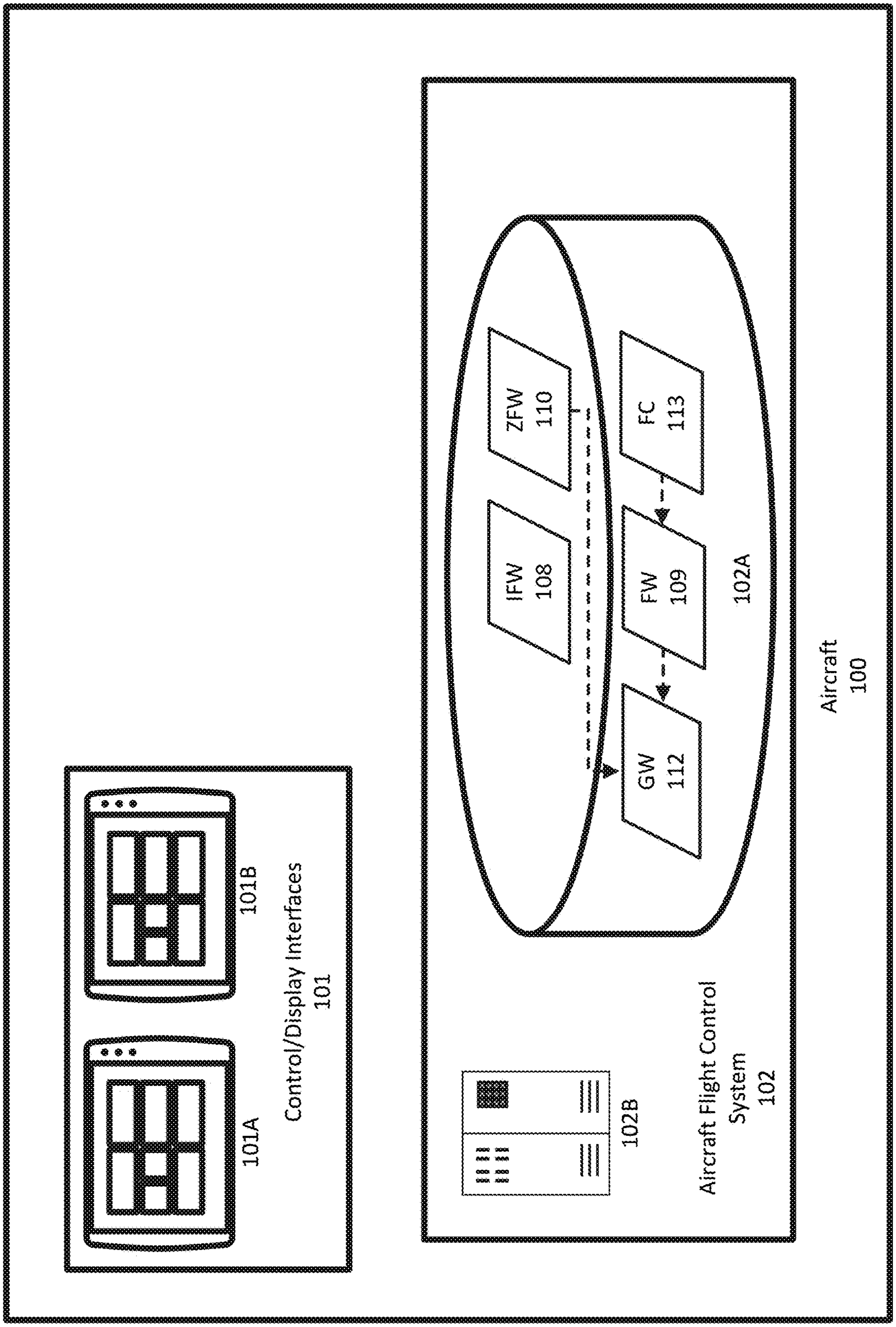

FIG. 7F corresponds to step 205 of FIG. 2. As shown in FIG. 7F, the FC parameter value 113 is used to update the FW parameter value 109. The FW parameter value 109 and the ZFW parameter value 110 are then used to update the GW parameter value 112. Although not shown in subsequent figures, it is understood that the FW parameter value 109 and GW parameter value 112 are continuously or periodically updated based on output of the fuel flow subsystem 104 during operation of the aircraft.

Figure 7G:
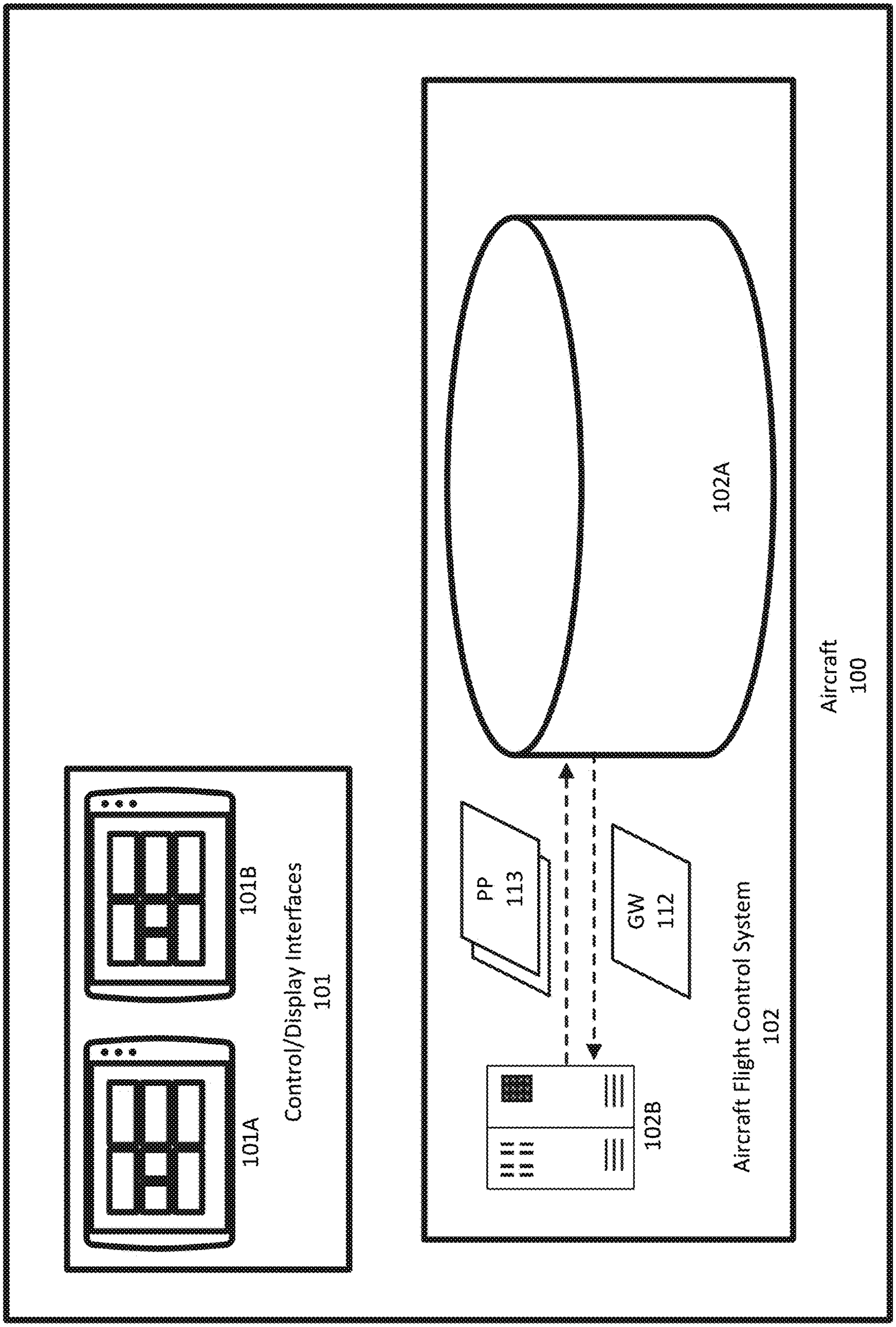

FIG. 7G corresponds to step 206 of FIG. 2 and illustrates the process of determining performance parameter (PP) values 113. The gross weight parameter value 112 is provided to the flight computer(s) 102B, which then calculates PP values 113. The PP values 113 can be stored in the data store 102A of the aircraft flight control system 102. Although not shown in the figure, it is understood that the PP values 113 are continuously or periodically updated based on current GW parameter values 112 during operation of the aircraft.

Figure 8:
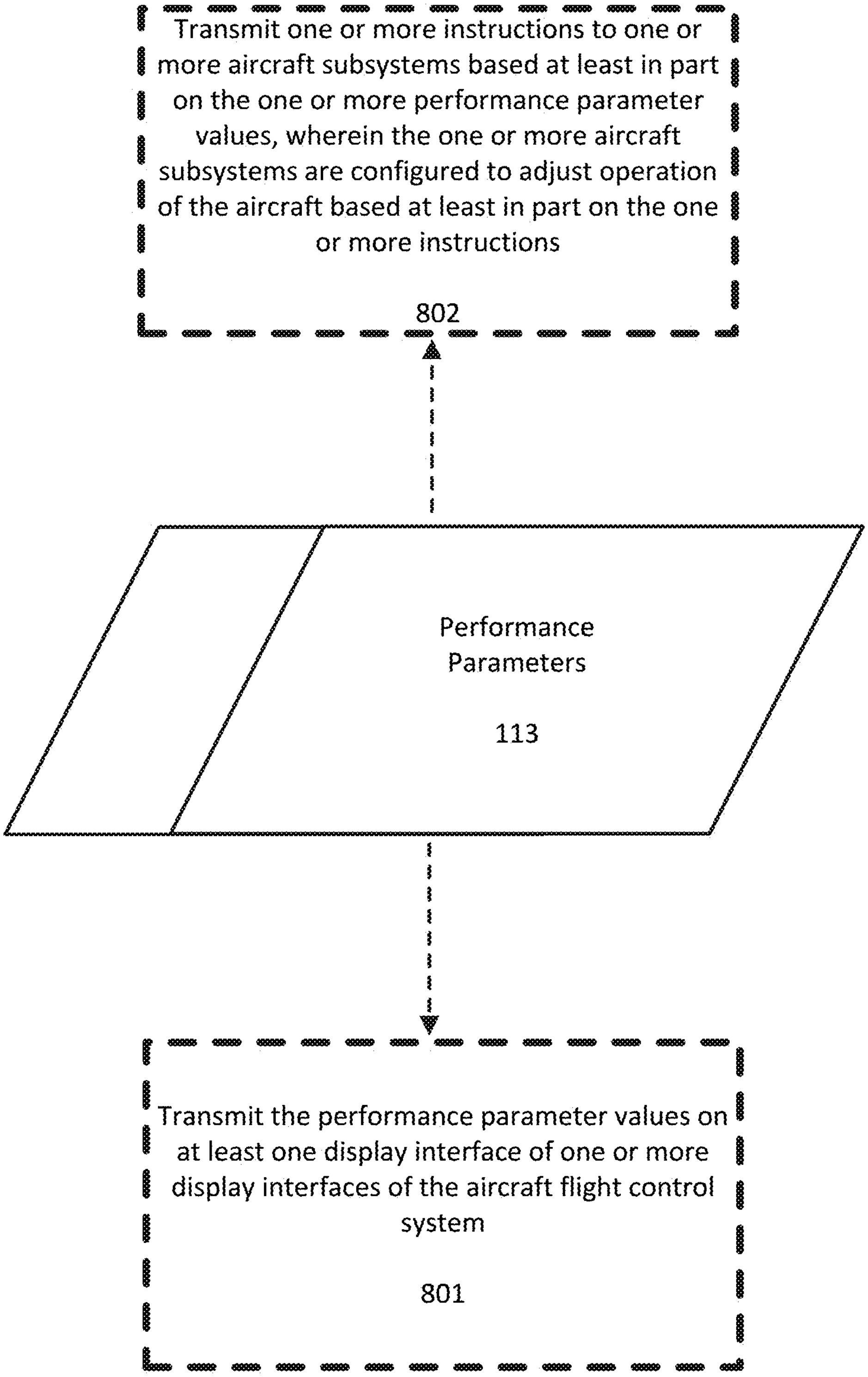
FIG. 8 illustrates a flowchart for utilizing determined performance parameter values according to an exemplary embodiment.

FIG. 8 illustrates a flowchart for utilizing determined performance parameter values according to an exemplary embodiment. The steps shown in FIG. 8 can be performed by the aircraft flight control system.

At step 801, the performance parameter values are transmitted on at least one display interface of one or more display interfaces of the aircraft flight control system. The display interface can be any of the interfaces previously described and the output of the performance parameters can be relied upon by an operator of the aircraft in piloting the aircraft, planning routes, estimating remaining fuel, or performing other actions.

Figure 9:
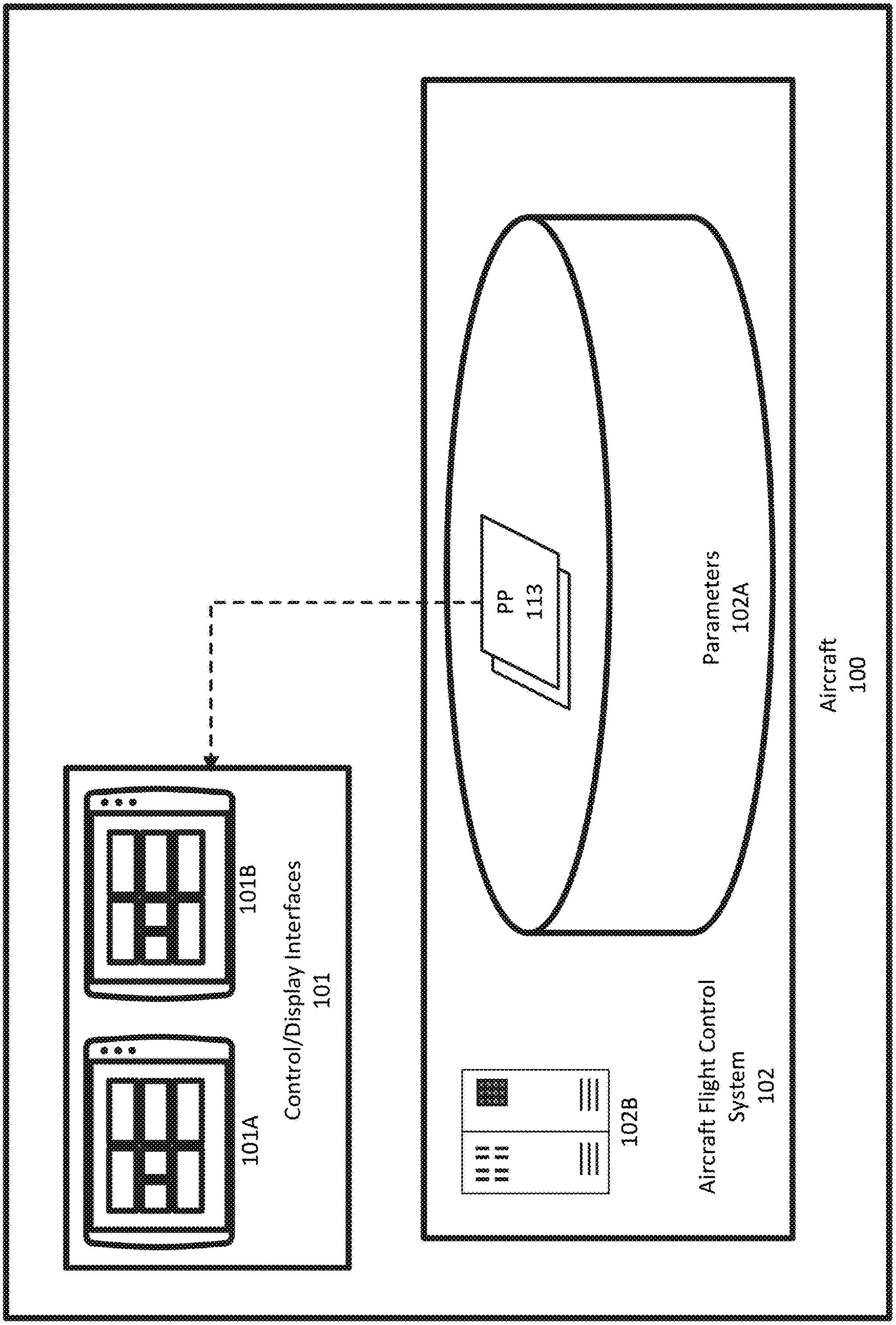
FIG. 9 illustrates an example of transmitting performance parameters in the system of FIG. 1, according to an exemplary embodiment.

FIG. 9 illustrates an example of transmitting performance parameters in the system of FIG. 1, according to an exemplary embodiment. As shown in FIG. 9, the determined performance parameter (PP) values 113 are transmitted to the control/display interfaces, where they can be displayed on one or more interfaces. Once again, it is understood that the transmission of performance parameter values can be performed continuously and/or periodically during operation of the aircraft.

Returning to FIG. 8, at step 802 one or more instructions are transmitted to one or more aircraft subsystems based at least in part on the one or more performance parameter values. The one or more aircraft subsystems can be configured to adjust operation of the aircraft based at least in part on the one or more instructions. The aircraft flight control system can be configured to automatically adjust operation of the aircraft based on certain performance parameter values. The aircraft flight control system can work in conjunction with one or more subsystems to implement these changes.

Figure 10:
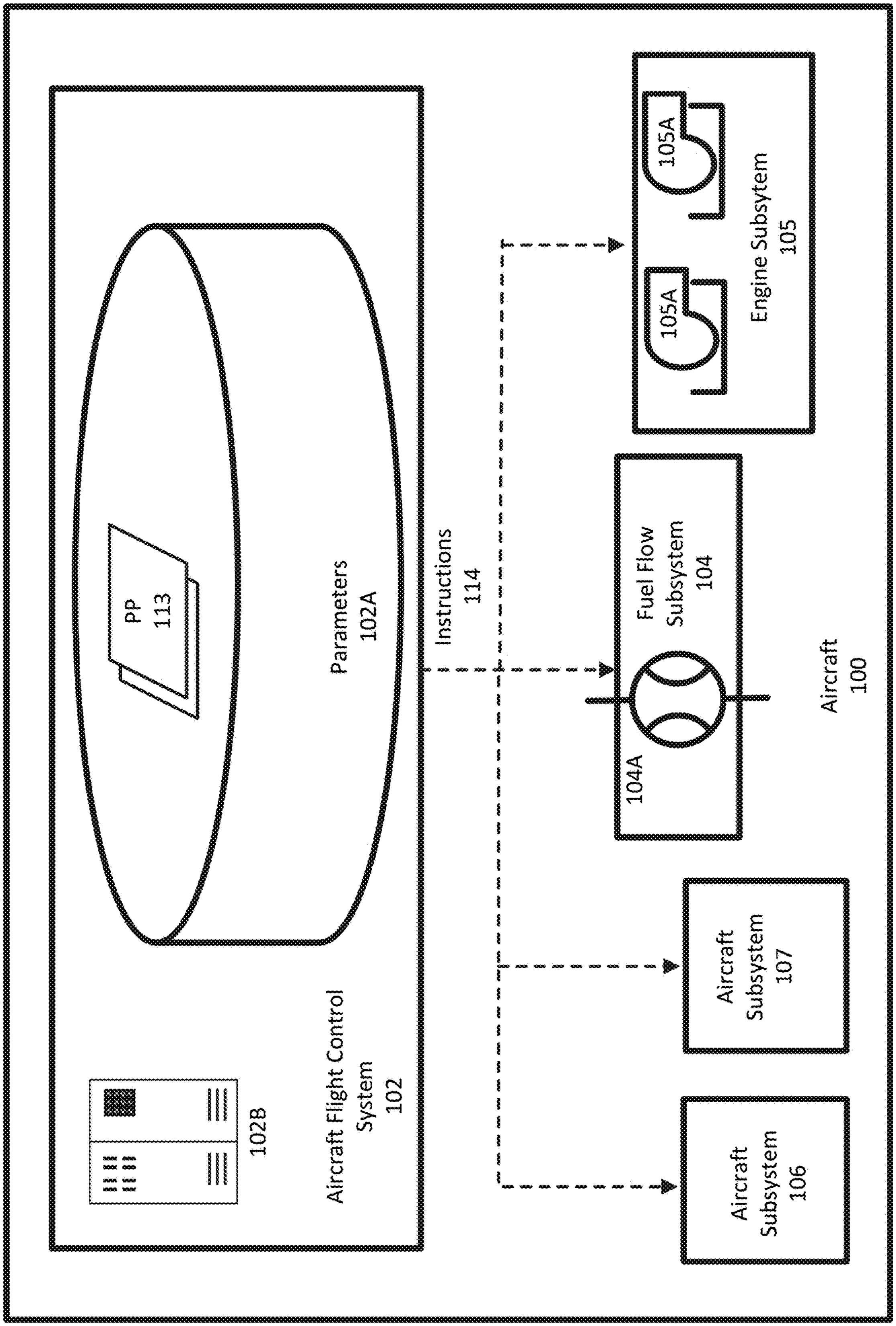
FIG. 10 illustrates an example of transmitting instructions to one or more aircraft subsystems based on performance parameter values in the system of FIG. 1, according to an exemplary embodiment.

FIG. 10 illustrates an example of transmitting instructions to one or more aircraft subsystems based on performance parameter values in the system of FIG. 1, according to an exemplary embodiment. As shown in FIG. 10, instructions 114 can be sent to any aircraft subsystem based on the determined performance parameter (PP) values 113. The aircraft subsystems that receive instructions can be, for example, the engine subsystem 105 or other subsystems such as 106 and 107. Once again, it is understood that the transmission of instructions based on performance parameter values can be performed continuously and/or periodically during operation of the aircraft.

Although two separate steps are shown in FIG. 8, it is understood that both steps 801 and 802 can be performed for one or more performance parameter values. For example, the aircraft flight control system can transmit certain performance parameter values for display on an interface and additionally send instructions to one or more aircraft subsystems based on those performance parameter values or different performance parameter values.

As explained above and throughout this application, the fuel parameter value that is used to determine the gross weight parameter value incorporates the phantom fuel value corresponding to the excess ZFW. However, it is necessary for the operator of the aircraft to track the actual fuel remaining in the aircraft and in each of the fuel tanks. The actual fuel quantity can be used to plan routes, determine fuel leaks, or perform other functions. Therefore, the aircraft flight control system can transmit the independent fuel weight parameter value on at least one display interface of one or more display interfaces of the aircraft flight control system.

Figure 11:
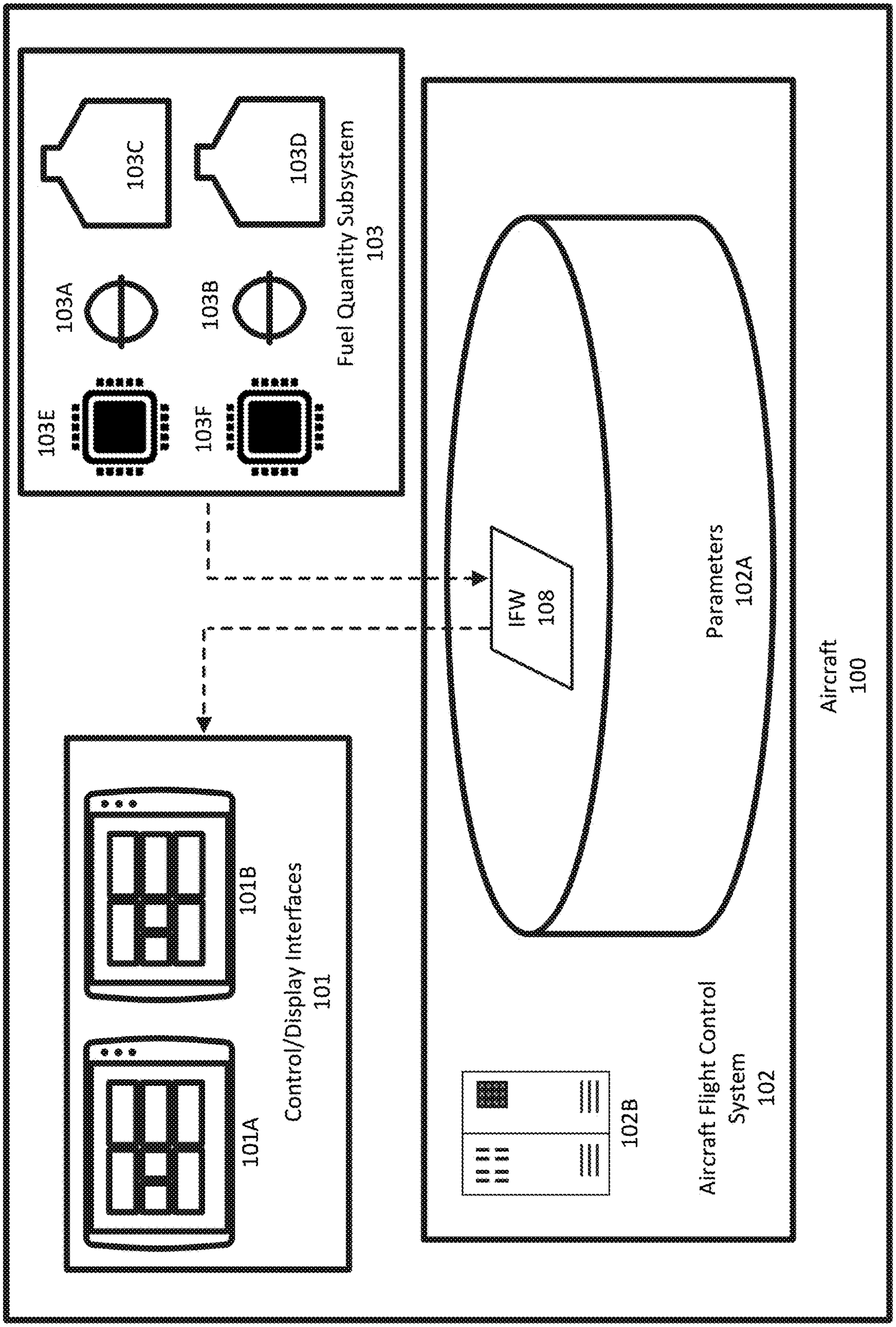
FIG. 11 illustrates an example of transmitting the independent fuel weight parameter value on at least one display interface of one or more display interfaces of the aircraft flight control system in the system of FIG. 1, according to an exemplary embodiment.

FIG. 11 illustrates an example of transmitting the independent fuel weight parameter value on at least one display interface of one or more display interfaces of the aircraft flight control system in the system of FIG. 1, according to an exemplary embodiment. As shown in FIG. 11, the output of the fuel quantity subsystem 103 (i.e., the output of fuel level sensors 103C and 103D) is used to determine the independent fuel weight parameter (IFW) value 108. As discussed previously, the independent fuel weight parameter value can be continuously or periodically updated. The IFW value 108 is then sent to the aircraft flight control system 102 and/or determined by the aircraft flight control system 102 based on the output of the fuel quantity subsystem 103. The IFW value 108 is then sent to from the aircraft flight control system 102 to the control/display interfaces 101. The control/display interfaces 101 can display the IFW parameter value on one or more output interfaces, such as the Engine Indicating and Crew Alerting System (EICAS) or on a screen of the Control Display Unit (CDU). Optionally, the IFW parameter value can be displayed on a different screen in the control/display interfaces 101 than the fuel weight parameter value which includes the phantom fuel value.

The aircraft flight control system includes several fuel related warning systems to ensure that the aircraft stores sufficient reserve fuel, as required by federal aviation requirements, and to ensure that the fuel quantity is sufficient for the selected aircraft route and present conditions. However, the phantom fuel procedure masks excess ZFW as phantom fuel, which can impact the fuel related warning systems and cause inaccuracies and incorrect or delayed warnings. Therefore, it is necessary to configure the aircraft flight control system and the fuel-related warning subsystems to account for the phantom fuel procedure.

Figure 12:
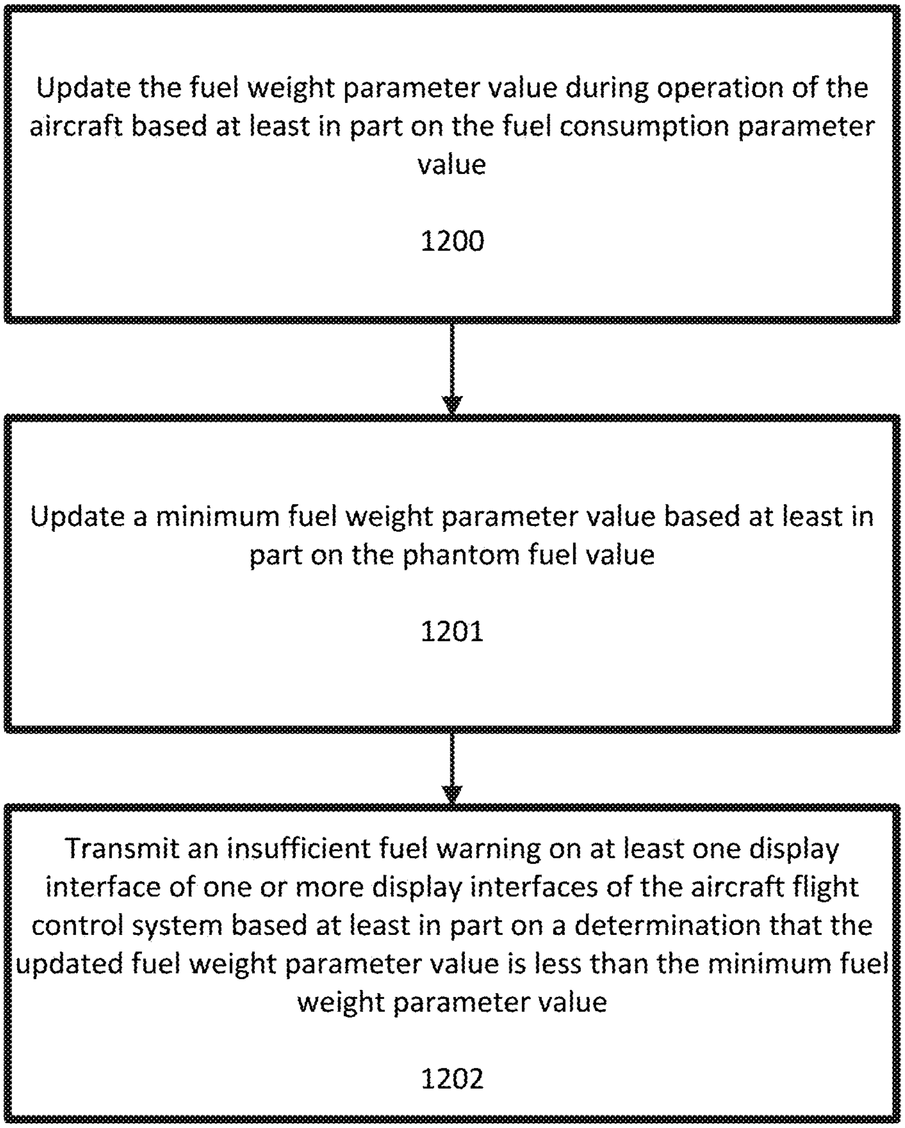
FIG. 12 illustrates a flowchart for configuring the aircraft flight control system and the fuel-related warning subsystems to account for the phantom fuel procedure according to an exemplary embodiment.

FIG. 12 illustrates a flowchart for configuring the aircraft flight control system and the fuel-related warning subsystems to account for the phantom fuel procedure according to an exemplary embodiment. The steps shown in FIG. 12 can be performed by crew in conjunction with the aircraft flight control system.

At step 1200 the fuel weight parameter value is updated during operation of the aircraft based at least in part on the fuel consumption parameter value. This is part of the routine or periodic updating of the fuel weight parameter value based on the output of the fuel flow sensors and fuel flow subsystems.

At step 1201 a minimum fuel weight parameter value is updated based at least in part on the phantom fuel value. The minimum fuel weight parameter is a minimum fuel weight that is required for a particular purpose. For example, the minimum fuel weight parameter can correspond to a minimum quantity of reserve fuel required on the aircraft, as set by dispatch.

Since the fuel weight parameter value is inflated by the phantom fuel value, the minimum fuel weight parameter value must also be incremented by the phantom fuel value to ensure correct functioning of fuel-related warning systems. This updating can be performed, for example, by adjusting configuration parameters accessible via one or more control interfaces of the aircraft flight control system.

At step 1202 an insufficient fuel warning is transmitted on at least one display interface of one or more display interfaces of the aircraft flight control system based at least in part on a determination that the fuel weight parameter value is less than the minimum fuel weight parameter value. The display interfaces can include the CDU, EICAS, or some other interface. By updating the minimum fuel weight parameter value, the aircraft flight control system ensures that fuel-related warnings are correctly displayed when the phantom fuel procedure is utilized. As an alternative procedure to the above-described procedure, the fuel-related warning subsystems can be reconfigured to subtract the phantom fuel value from the current value of the fuel weight parameter value instead of adding the phantom fuel value to the minimum fuel weight parameter value. As another alternative, the aircraft flight control system can be reconfigured to utilize the independent fuel weight parameter value (determined based on the output of fuel level sensors) for fuel-related warning subsystems rather than the fuel weight parameter value (which incorporates the phantom fuel value).

Figure 13:
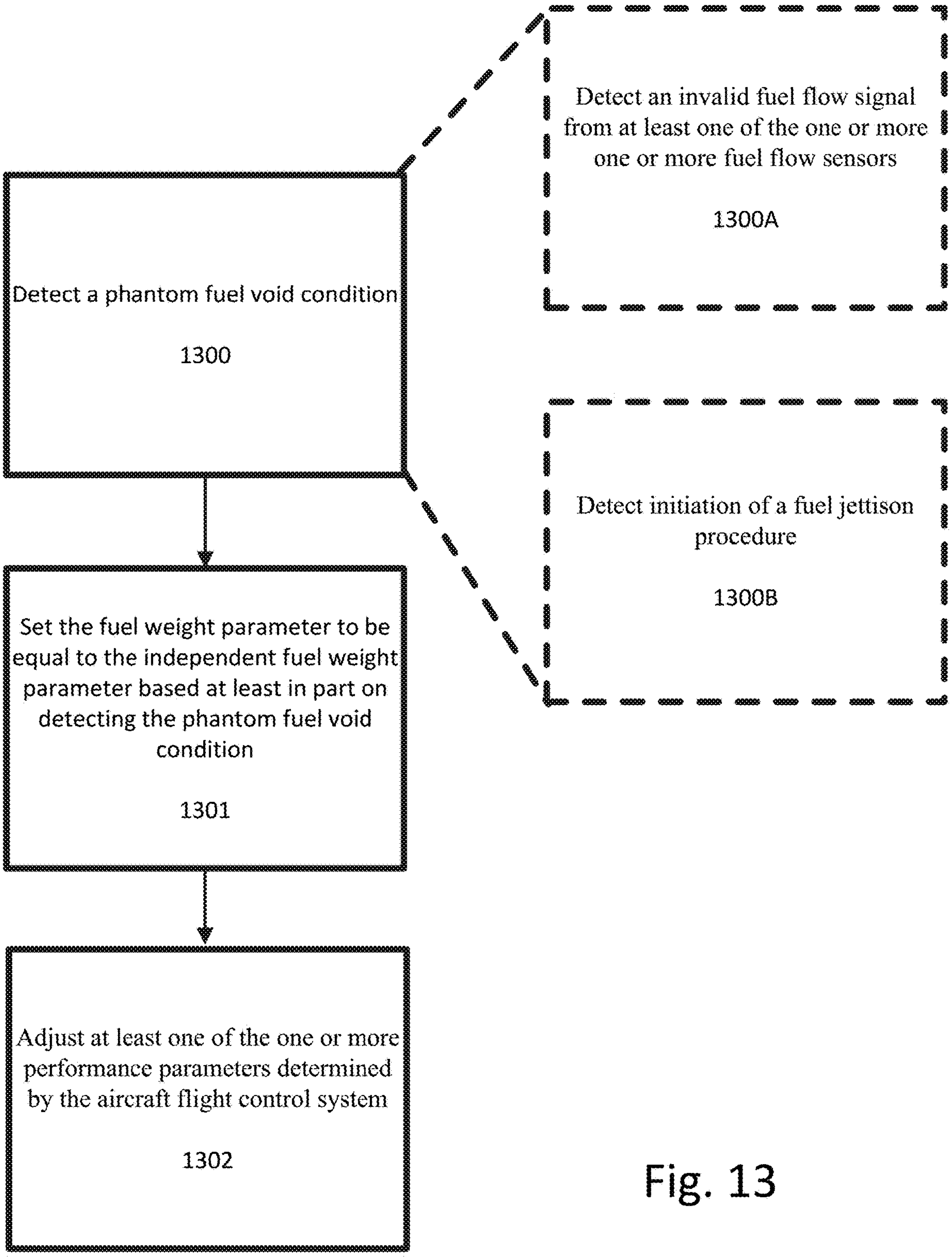
FIG. 13 illustrates a flowchart for voiding the phantom fuel procedure according to an exemplary embodiment.

In certain scenarios, the phantom fuel procedure may need to be voided. FIG. 13 illustrates a flowchart for voiding the phantom fuel procedure according to an exemplary embodiment. Each of the steps shown in FIG. 13 can be performed by the aircraft flight control system.

At step 1300 a phantom fuel void condition is detected. A phantom fuel void condition is a condition which necessitates abandoning the phantom fuel procedure and resetting the fuel weight parameter to the correct fuel weight.

The phantom fuel void condition can be detecting an invalid fuel flow signal from at least one of the one or more one or more fuel flow sensors, as shown in step 1300A. An invalid fuel flow signal can indicate, for example, a malfunction with one or more of the fuel flow sensors that makes the sensor unable to accurately assess fuel flowing to the engines. An invalid fuel flow signal can also indicate some other defect or condition that makes accurate measurement of fuel flow impossible. The invalid fuel flow signal can be triggered by, for example, receiving an invalid fuel flow signal for a certain threshold period of time (e.g., two minutes). In this case, the only mechanism by which an accurate measure of remaining fuel can be determined is the independent fuel weight parameter value determined by the fuel quantity subsystem.

The phantom fuel void condition can also be detecting initiation of a fuel jettison procedure, as shown in step 1300B. Fuel jettison is a procedure used by aircraft in emergency situations and is the intentional release of fuel from an aircraft while in flight. The release of fuel via jettison results in an inaccurate estimate of remaining fuel based on fuel flow sensors (which measure fuel flowing to the engines). In this situation, the only mechanism by which an accurate measure of remaining fuel can be determined is again the independent fuel weight parameter value determined by the fuel quantity subsystem. The phantom fuel procedure can later be re-entered by resetting the fuel weight parameter value to be the independent the fuel weight parameter value in addition to the phantom fuel value after the jettison is completed.

Of course, these phantom fuel void conditions are provided for illustration only, and it is understood that other conditions can also be utilized to determine when to void the phantom fuel procedure, such any other conditions affecting accurate tracking of remaining fuel via the fuel flow sensors, including detection of a confirmed fuel leak.

At step 1301 the fuel weight parameter is set to be equal to the independent fuel weight parameter based at least in part on detecting the phantom fuel void condition. This step essentially removes the phantom fuel procedure by defaulting the fuel weight parameter value back to the fuel sensed by the fuel quantity subsystem (i.e., the independent fuel weight parameter value determined by the fuel level sensors).

In certain scenarios, the fuel weight parameter can set to be equal to the independent fuel weight parameter even one of the phantom fuel void conditions set forth above are not detected. For example, if there is a disparity over a certain threshold (e.g., 3K pounds) between the sensed fuel (i.e., the independent fuel weight parameter value) and the calculated fuel (the fuel weight parameter value), then a “fuel disagree” message and diagnostic information can be presented to an operator. The purpose of this information is to allow the operator to identify a fuel leak, and the operator can optionally select an option to set the fuel weight parameter value to be equal to the independent the fuel weight parameter value, in which case the phantom fuel value will be lost. In this situation, which only occurs when there is a confirmed fuel leak, the phantom fuel procedure can later be re-entered by resetting the fuel weight parameter value to be the independent the fuel weight parameter value in addition to the phantom fuel value.

However, once the phantom fuel procedure is canceled and the phantom fuel value (PFV) is lost, the gross weight parameter value determined by the aircraft flight control system will not accurately reflect the actual gross weight of the aircraft. In situations where the phantom fuel value cannot be reentered, at least one of the one or more performance parameters determined by the aircraft flight control system are adjusted, as indicted by step 1302 of FIG. 12. This adjustment can be performed by an operator of the aircraft, or alternatively one or more automated procedures of the aircraft flight control system can be configured to perform these adjustments.

The loss of the PFV affects many of the performance calculations made by the as the aircraft flight control system will think the aircraft lighter than the actual gross weight. Some of the functions affected are reference V speeds, displayed flap maneuver speed, fuel predictions at waypoints, optimum and maximum altitude calculations, the displayed maneuver margins, engine out maximum/driftdown altitude, engine out driftdown speeds, holding speed, and holding altitude. The specifics of each of these parameters are discussed below with reference to FIGS. 14A-14E. The procedures described below use the example of a Boeing 777-200LR aircraft and are for purposes of explaining the adjustment process and procedures only. The procedures and data described below assume a worst-case scenario where the gross weight parameter value is 43,000 pounds lighter than the actual gross weight.

FIGS. 14A-14E illustrate tables used for adjustment of performance parameters in the event of loss of the phantom fuel value and cancellation of the phantom fuel procedure according to an exemplary embodiment.

FIGS. 14A-14B illustrate table of adjustments to VREF (i.e., reference landing speed) at various weights. The loss of PFV is not applicable to the takeoff V speeds. As previously discussed, three conditions that can cause the loss of the PFV are a fuel leak, a faulty fuel flow sensor, and/or fuel jettison. If a faulty fuel flow sensor is detected or there is a fuel leak while on the ground the aircraft will not be able to depart. In the event the PFV is lost during the flight, the VREF presented by the interface (e.g., the CDU) will be lower than the actual VREF speed because the aircraft flight control system thinks the aircraft's gross weight is lighter than the actual gross weight. A worst-case scenario was determined for VREF20, VREF25, and VREF30. For all flap settings, the difference between the actual VREF and the VREF without the PFV is between 5.7 and 6.1 knots at or below MLW (maximum landing weight). As weight increases beyond MLW, flaps 20 remains in a similar range until 745,000 lbs where the difference decreases to 4.9 knots; at Maximum Takeoff Weight (MTOW) the difference between the two values is 3.9 knots. Flaps 25 maintains a similar profile as weight increases beyond MLW. The difference is between 5.6 and 5 knots between 595,000 lbs and 720,000 lbs; at MTOW the difference is 2.9 knots. For flaps 30, as weight increases beyond MLW, the difference between the correct VREF and the VREF presented ranges from 5.2 to 8.3 knots.

Tables 1401, 1402, and 1403 in FIGS. 14A-14B provide the effect on VREF at various weights. The following conditions were assumed: a forward CG, a dry 10000' runway at sea level, packs on, and wing anti-ice (WAI) and engine anti-ice (EAI) off.

In the even phantom fuel is lost, the crew can still obtain an accurate VREF using the aircraft flight control system. The gross weight displayed on an approach ref page of an interface is calculated by the aircraft flight control system by adding the fuel weight parameter value to the ZFW parameter value entered on the PERF INIT page. However, the flight crew can manually enter the aircraft's gross weight, overriding the calculated weight. The aircraft flight control system will then calculate VREF based on the manually entered weight. The correct speeds are then entered into the aircraft flight control system. Therefore, in the event PFV is lost, the operator can obtain accurate approach speeds by entering the actual gross weight of the aircraft on the Approach ref page of the interface.

FIG. 14C illustrate flap maneuver speeds in the event of loss of phantom fuel. The flap maneuvering speeds displayed on a speed tape of the interface are a function of the aircraft flight control system. For all flap settings except 25 and 30, flap maneuvering speed is calculated by adding a value to VREF30 (see table 1404). The flap maneuvering speeds for flaps 25 and flaps 30 are VREF25 and VREF30 respectively. Since the flap maneuver speeds are based on VREF, they are, by extension, based on the gross weight of the aircraft.

Because they are based on VREF, the loss of PFV will induce an error in the flap maneuvering speeds displayed on the PFD. During testing it was determined that the most effective work around for the error is to manually calculate the maneuver speeds based on the correct VREF30 and VREF25. Because the accurate VREF30 will be displayed on the flight interface, the crew will be able to quickly determine the accurate flap maneuvering speed by using the table shown in FIG. 14C. As discussed in the previous section, the correct VREF25 is displayed on the Approach Ref page. In the event flaps 25 is selected for landing, VREF30 will not be displayed on the interface the crew will have to calculate the flap maneuver speeds using the Approach Ref page of the interface.

The loss of the PFV can also have an impact on fuel predictions. The aircraft flight control system will display fuel predictions various pages of the interface. The aircraft flight control system calculates the estimated fuel at a waypoint using complex aerodynamic and propulsion models that are referred to as the Aero/Engine Model Data Base (AEMDB). The AEMDB considers an extensive list of performance parameters such as aerodynamic constants, thrust to fuel flow, altitude correction to fuel flow, and wind speed corrections. While developing the Phantom Fuel Procedure, it was determined that the loss of the PFV can have a significant detriment on the accuracy on the predicted fuel, particularly on ultra-long-haul flights conducted at very high weights. Given the high number of variables in the AEMDB, it is difficult to determine the exact cause of the discrepancy.

The three conditions that will lead to the loss of the PFV are a selection of the independent fuel value by the flight crew (e.g., in response to a fuel leak), fuel jettison, and an invalid fuel flow signal from one of the engines. Fuel is only jettisoned as a way to quickly decrease the weight of the aircraft to MLW or less in the event of an emergency in order to land. Therefore, in the event of a fuel jettison, it can be assumed that the aircraft is landing shortly and has plenty of fuel to do so.

In the event of a center tank fuel leak, the flight crew is directed to determine if there is sufficient fuel in the main tanks to complete the flight prior switching to the totalizer fuel quantity (e.g., setting the independent fuel weight parameter value to be the fuel weight parameter and voiding the phantom fuel procedure). As switching to the totalizer quantity is the action that removes the PFV, the crew will be able to use the fuel prediction function to assist in that determination. By the time the PFV has been deleted, it has already been determined that there is adequate fuel to either complete the flight or divert. Additionally, the flight crew will still have the fuel quantity displayed by fuel quantity subsystem and the engine fuel flow to predict fuel remaining. If there is a main tank leak, the crew is directed to land at the nearest suitable airport. In this scenario, the crew is landing as soon as possible regardless of what is shown by the fuel predictions. Alternatively, the crew can manually update the gross weight rather than selecting the totalizer.

In the event of a faulty fuel flow signal, fuel predictions will be based off the sensed fuel value. As a result, the predictions will be inaccurate. In this scenario the crew cannot rely on the aircraft flight control system fuel prediction functionality. Therefore, crews will need to compare their actual fuel quantity to the estimates determined during flight planning.

Loss of the PFV also affects the displayed maneuver margins of the aircraft. The maximum and minimum maneuver margins displayed on the interface are determined by the aircraft flight control system as a function of the aircraft's altitude, flap position, and gross weight. As weight is considered in the determination of the maneuver margins, the loss of Phantom fuel will cause the lower maneuver margin displayed on the interface to be incorrect. Analysis of the Buffet Onset Characteristic charts in the aircraft flight manual (AFM) shows that in the weight range Phantom Fuel Procedures would be in effect, the maximum maneuver margin will always exceed the Maximum Mach Operating number (MMO). If phantom fuel is lost, the upper maneuver margin calculated by the aircraft flight control system still exceeds MMO. This was determined by determining the maneuver margins for a given weight and altitude. In order to determine the effect of losing the phantom fuel value, the same margins were determined for a weight 40,000 pounds less than the original calculation.

There are several different ways the aircraft flight control system determines the lower maneuver margin depending on the aircraft's configuration and altitude. With flaps between 1 and 20 the lower maneuver margin is a factored stick shaker speed equal to 1.14 times the calibrated stick shaker speed plus a 5-knot pad. The factored stick shaker speed is provided by the Warning Electronics System (WES). For flaps 25 and 30, the minimum maneuver speed is the maximum of the VREF entered on the Approach Ref page and the factored stick shaker speed. When the aircraft is in takeoff mode and flaps are down, the minimum maneuver speed is equal to 0.9199 times the factored stick shaker speed in order to assure the minimum maneuver margin does not exceed V2. Because the Factored Stick Shaker speed comes from the WES, it is unaffected by the aircraft flight control system gross weight. Therefore, the phantom fuel procedure has no effect on the displayed maneuver margins when the flaps are down. With flaps up and an altitude less than 20,200 the minimum speed is the factored stick shaker speeds limited to not exceed the flaps up extension speed (VREF+80). As with the flaps down maneuver margin, this is unaffected by the phantom fuel procedure.

For altitudes above 20,200 feet, the minimum speed is the speed that provides the specified maneuver margin to low-speed initial buffet. This speed can be determined using the cruise maneuvering capability charts found in the AFM. Analysis of the charts shows that the displayed minimum maneuver speed will decrease by 8 to 22 knots (see table 1405 in FIG. 14D). The largest discrepancy occurs when the aircraft is light and close to maximum altitude. Although there is some variance in the effect on airspeed, the reduction in margins is consistent at all altitudes and weights. The margin to initial buffet is reduced from 1.3 to between 1.21 and 1.23. As weight increases, the margin increases slightly. The 1.3 margin equates to a bank angle of 39.72° whereas the reduced margins equate to a bank angle between 34.26° and 35.61°.

The maximum and optimum altitude are also affected by the loss of the phantom fuel value. The aircraft flight control system will calculate both the optimum and maximum altitude as reference information. These altitudes are provided as information only; regardless of what is displayed the autopilot will not climb above the altitude entered in the Mode Control Panel (MCP). However, both maximum and optimum altitude are a function of the aircraft's weight. If the PFV is lost, the aircraft flight control system will think the aircraft is lighter than it is, and the altitudes displayed will be incorrect.

The difference between the actual maximum and optimum altitudes and those presented in the event the PFV is lost have been evaluated using the maximum altitude chart found in the Flight Planning and Performance Manual (FPPM). For maximum altitude, the altitude presented is between 925 and 1300 feet higher with the difference increasing as the aircraft weight decreases. For optimum altitude, the altitude presented is between 1235 and 1640 feet higher with the difference increasing as aircraft weight decreases. The difference for both altitudes is shown in detail in tables 1406 and 1407 in FIG. 14E.

Based on this analysis, crews should subtract 2,000 feet from the altitudes displayed in order to determine the actual optimum and maximum altitudes. 2,000 feet allows for quick, simple calculations and provides a safety pad for all conditions. Another possible solution is looking up the actual maximum and optimum altitudes in a table provided to the crew.

The recommended hold speeds are also affected by the loss of the phantom fuel value. The aircraft flight control system calculates and displays the best hold speed. This speed is presented as reference information to the flight crew to aid in the selection of a holding speed. The speed at which the hold is flown is determined by the MCP when not in VNAV (vertical navigation). When in VNAV the aircraft will fly the speed entered in the SPD/TGT ALT line of the interface.

The best speed is a function of the aircraft's weight and altitude. As a weight-based parameter, the loss of the PFV will induce an error in the presented speed. By analyzing the holding tables found in the FPPM, it was determined that the crew can add 10 knots to the presented speed to obtain an accurate holding speed. Additionally, the crew could be provided with a simplified version of the table found in the FPPM to determine the best hold speed.

In addition to the best speed, the interface will also provide a HOLD AVAIL prediction. This value is the amount of time the aircraft can remain in the hold and reach the destination with the required reserves. Because fuel predictions provided by the FMS are inaccurate when PFV is lost, the crew cannot rely on this value. As with all fuel predictions, in the event the PFV is lost, the crew must manually determine if the fuel on board is adequate.

The VNAV descent path was also evaluated in the scenario where phantom fuel value is lost. The aircraft flight control system generates the VNAV descent path by starting at the lowest altitude constraint and projecting up to the cruise altitude. Whenever possible, the aircraft flight control system will build the descent segments using an idle thrust path. If it is not possible to meet a restriction, the aircraft flight control system will either build in a level off or command a speed using the throttles to meet the restriction. Top of descent to the first restriction will always be an idle thrust path. In the evaluation of the loss of Phantom Fuel, there was concern that VNAV descents would not be possible as the idle thrust descent path would be calculated using an inaccurate gross weight. However, the effects of losing Phantom Fuel on VNAV descent were evaluated using the simulator and on aircraft. In the simulator the aircraft was flown at a weight of approximately 610,000 lbs. With the PFV removed the simulator was able to meet all altitude constraints using VNAV. Speed constraints were able to be met with the assistance of the speed brakes.

The engine out performance of the aircraft was also evaluated in the scenario where phantom fuel value is lost. Using the VNAV key on the interface, the crew can select between the following cruise performance modes: Economy, Selected Speed, Long-Range Cruise, Engine Out, Cruise Climb, and Cruise Descent. In the event of an engine failure, the engine out page ordinarily provides the maximum altitude and driftdown/climb speed to the crew. However, if the PFV is lost, then the data on this page will be inaccurate. In this case, the actual speed can be looked up for the descent and the crew can be directed to climb at VREF30+80, based on the flight training manual.

Additionally, when engine out performance mode is active VNAV will slow to then engine out speed and climb or descend to the altitude entered by the crew. The Engine Out speed can be manually overridden by the crew. Both the driftdown speed and maximum altitude calculations are affected by the gross weight of the aircraft. In the event the PFV is lost, the speed and altitude presented by the aircraft flight control system will be slightly inaccurate.

To determine a correction the driftdown/level off table found in the FCOM (flight crew operating manual) was evaluated. It was determined that the maximum altitude can be determined by subtracting 2,000 feet from the altitude presented by the aircraft flight control system. Subtracting 2,000 feet ensures that the actual driftdown altitude is not exceeded and provides a safety pad. As explained above, the engine-out climb speed can be VREF30+80, based on the flight training manual. To determine an accurate driftdown speed, 10 knots will be added to the presented speed. Additionally, the driftdown speed and level off altitudes are provided to the crew in the Performance Inflight section of the QRH (Quick Reference Handbook). The corrected values can be entered into the aircraft flight control system to ensure accurate VNAV operation.

The position reporting functionality of the aircraft was also evaluated in the scenario where phantom fuel value is lost. Using the MFD communication function, the flight crew can send position reports to both the operator and ATC (air traffic control). In the development of the Phantom Fuel Procedure, there was concern that the fuel value in the position report would come from the fuel weight parameter value and would therefore be inaccurate during Phantom Fuel operations. However, as the ATC does not use the provided fuel value for any purpose, the transmission of the phantom fuel value would have no impact on operation of the ATC or the aircraft.

Use of the phantom fuel procedure can result in changes to fuel-warning systems, such that fuel-related warnings are displayed more often than they would be otherwise. Fuel-related warnings can include, for example, a fuel disagree warning, an insufficient fuel warning, a fuel imbalance warning, and/or a low fuel quantity warning. However, in many cases, the fuel disagree warning can be disregarded when using the phantom fuel procedure, since the fuel-related warnings are triggered by a discrepancy over a predetermined threshold between the independent fuel weight parameter value and the fuel weight parameter value and not a fuel leak or other safety condition.

Figure 15:
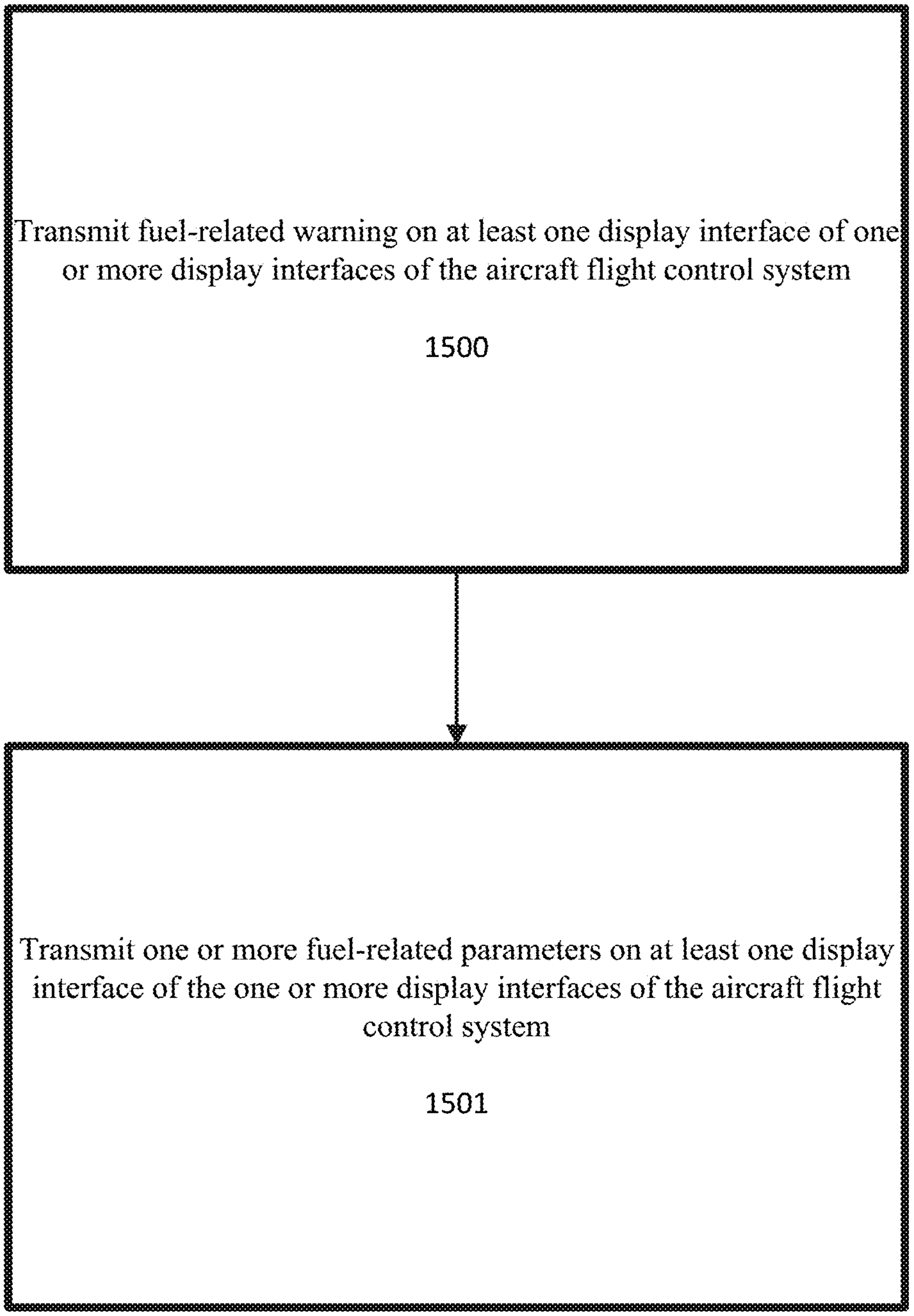
FIG. 15 illustrates a flowchart for evaluating fuel-related warnings when utilizing a phantom fuel procedure according to an exemplary embodiment.

FIG. 15 illustrates a flowchart for evaluating fuel-related warnings when utilizing a phantom fuel procedure according to an exemplary embodiment. At step 1500 a fuel-related warning is transmitted on at least one display interface of one or more display interfaces of the aircraft flight control system. As discussed above, the fuel-related warning can be one or more of a fuel disagree warning, an insufficient fuel warning, a fuel imbalance warning, and/or a low fuel quantity warning. At step 1501 one or more fuel-related parameters are transmitted on at least one display interface of the one or more display interfaces of the aircraft flight control system. The one or more fuel-related parameters are configured to allow an operator of the aircraft to determine whether a fuel leak is a cause of the fuel-related warning. The specific processes used to evaluate different fuel-related messages are described in greater detail below and with respect to FIGS. 16A-16E.

FIGS. 16A-16E illustrate flowcharts for evaluating specific fuel-related warnings when utilizing a phantom fuel procedure according to an exemplary embodiment. These flowcharts can correspond to checklists, such as electronic checklists coded into the aircraft flight control system, that are used by the aircraft operator in evaluating the warnings and evaluating a suspected fuel leak.

There are five Non-Normal Checklists (NNC's) that are modified when using the phantom fuel procedure. These include the Fuel Imbalance, Fuel Leak, Fuel QTY Low, Insufficient Fuel and Fuel Disagree checklists. The FUEL DISAGREE advisory message is a known nuisance of the Phantom Fuel Procedure as such the Fuel Disagree NNC will be updated to tell crews to resume normal operation if the PFV is greater than or equal to 6,500. The Insufficient Fuel, Fuel QTY Low, and Fuel Imbalance NNC's all drive the crew to check for the possibility of a fuel leak. One of the items that would cause a crew to suspect a fuel leak is, "On Progress page 2, the totalizer is less than the calculated fuel." Under Phantom Fuel operations, this condition will always be true, regardless of a fuel leak. Therefore, the modified checklists will say, "On PROGRESS page 2, the difference between the totalizer and calculated fuel exceeds the Phantom Fuel Value." The Fuel Leak Checklist directs the crew to select the totalizer fuel in the event of a FUEL DISAGREE advisory. Selecting the totalizer would result in an inaccurate FMC gross weight. Therefore, the modified Fuel Leak checklist will direct the crew to re-enter the Phantom Fuel at a minimum of every 30 minutes. Once the effected tank is empty, the crew will no longer need to manually update the fuel.

Figure 16A:
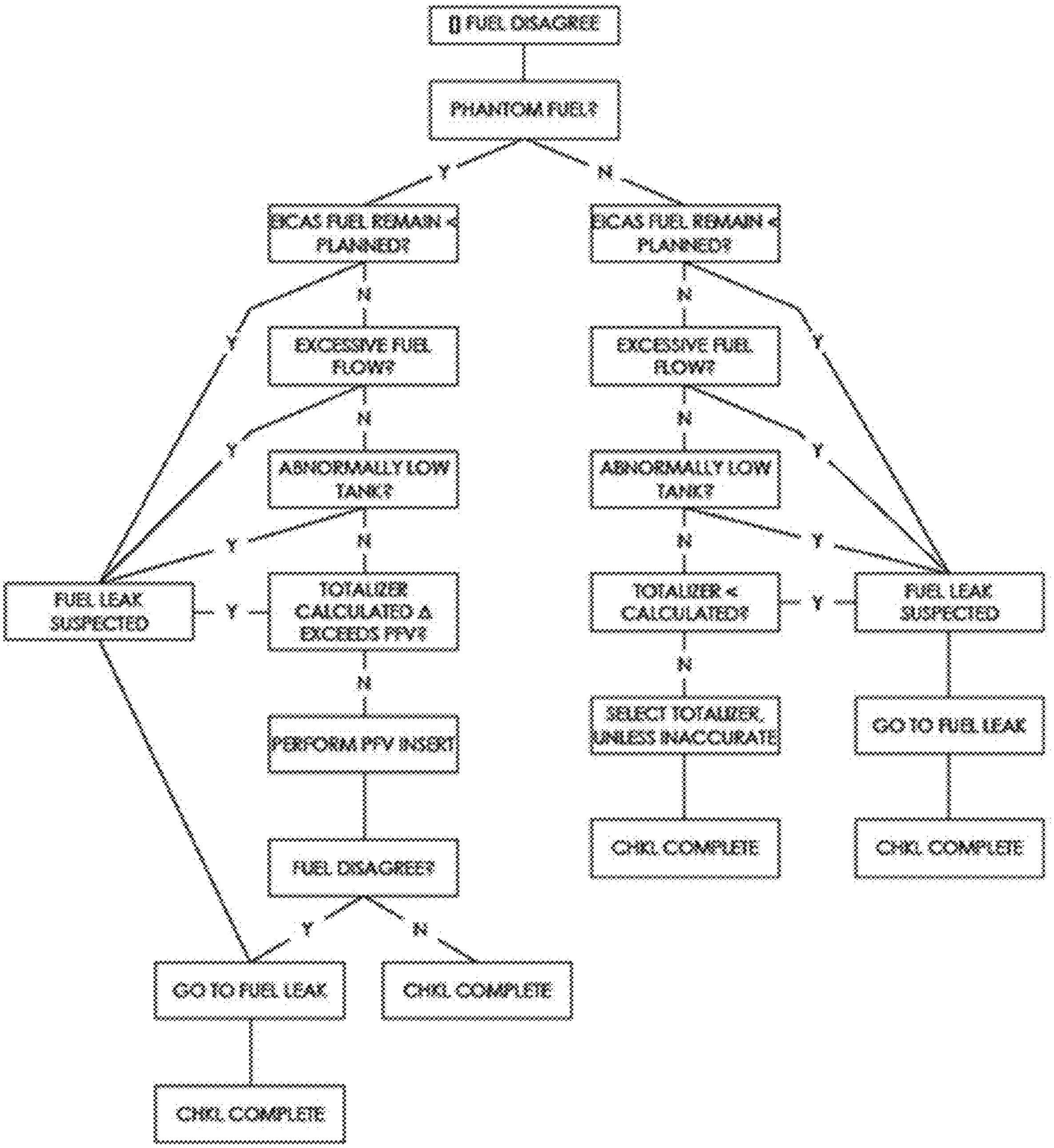
FIGS. 16A-16E illustrate flowcharts for evaluating specific fuel-related warnings when utilizing a phantom fuel procedure according to an exemplary embodiment.
Figure 16B:
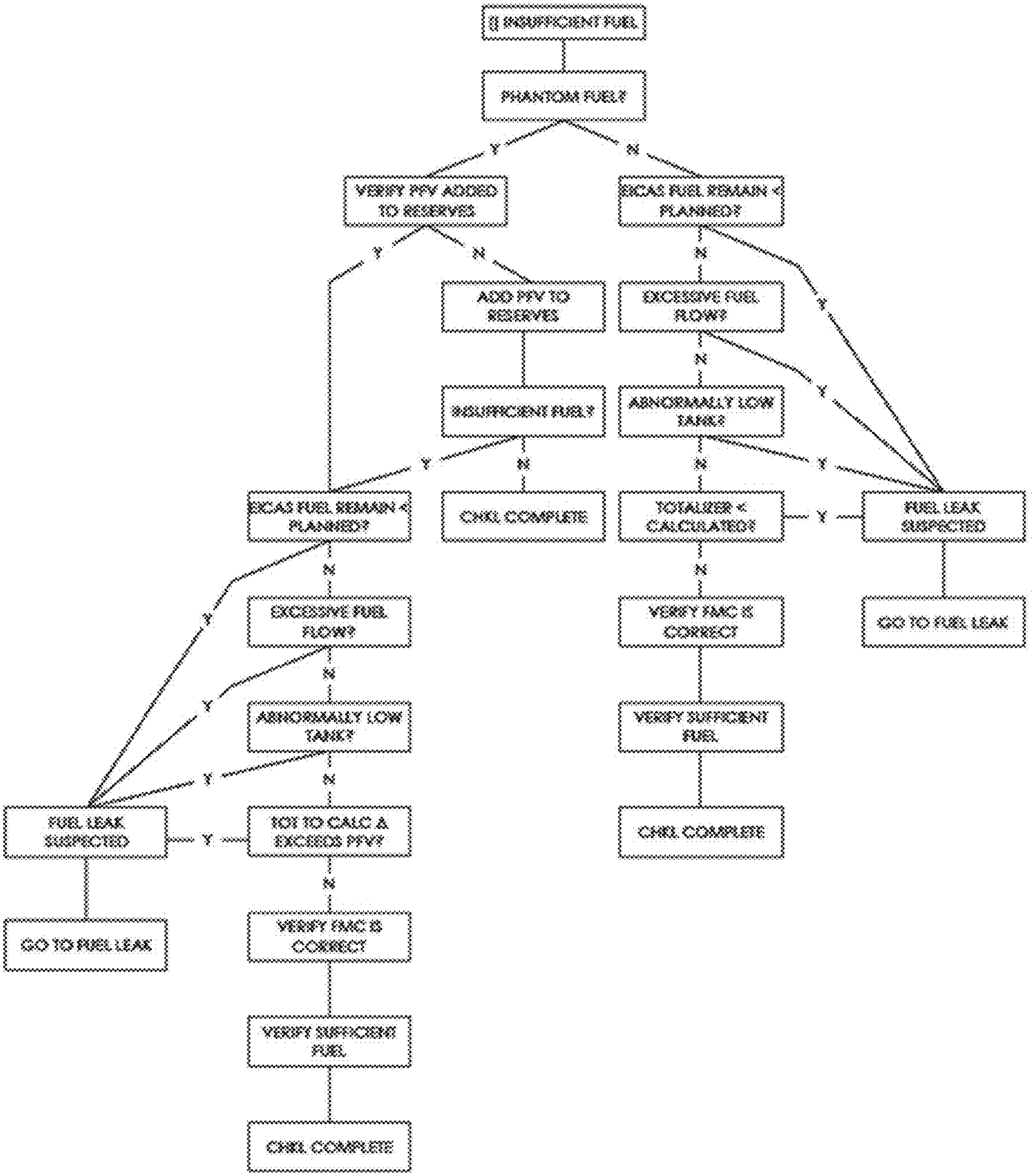
Figure 16C:
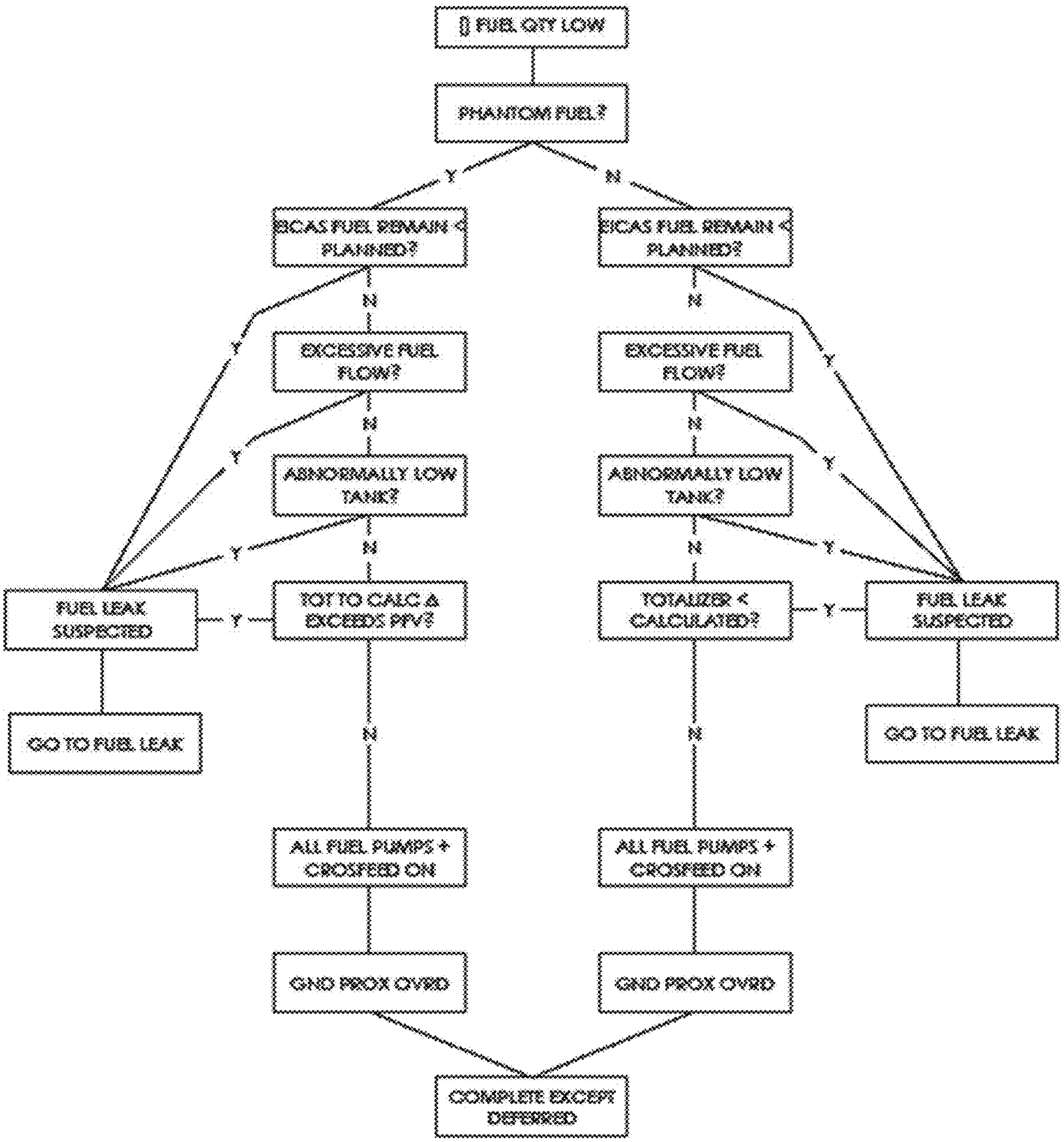
Figure 16D:
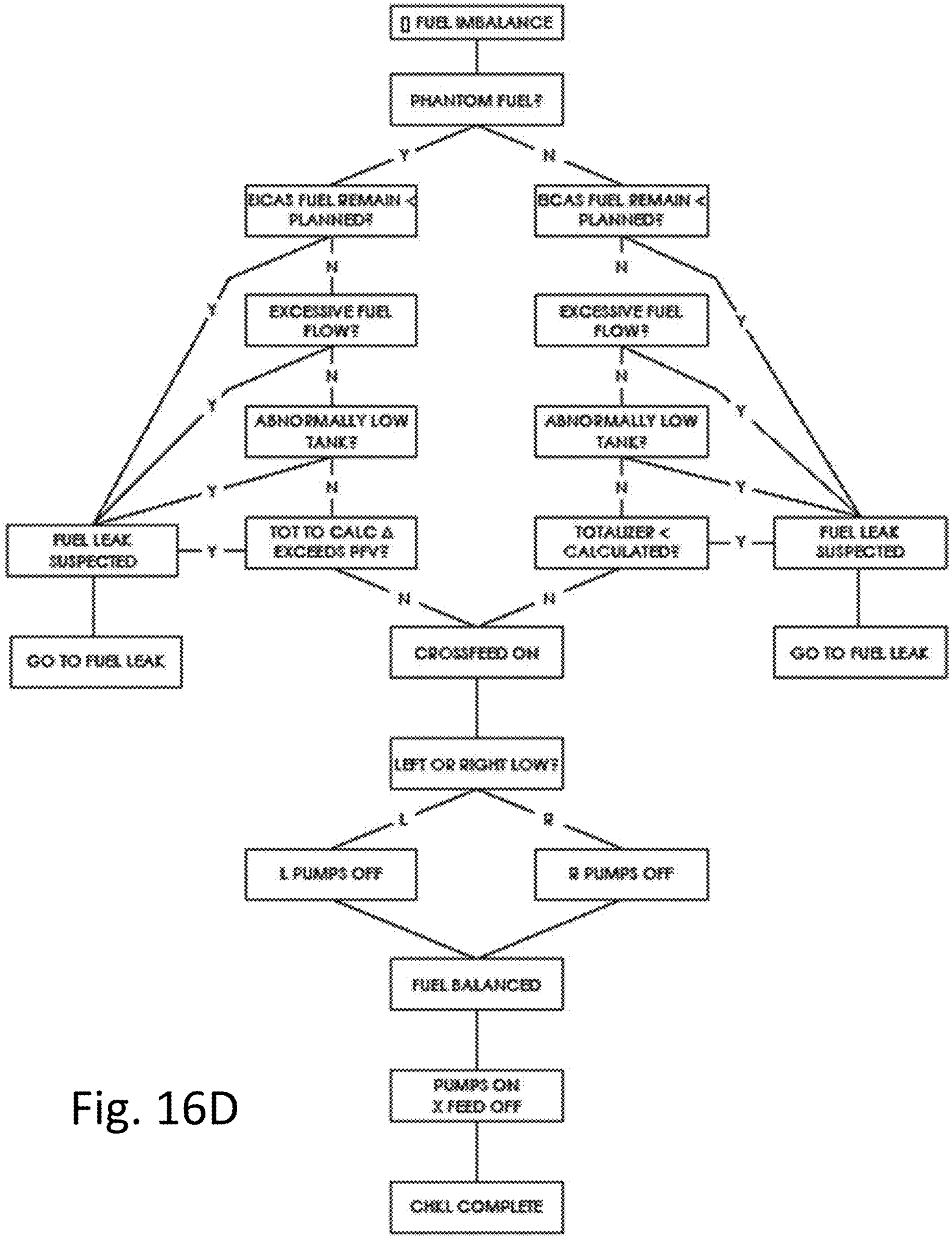
Figure 16E:
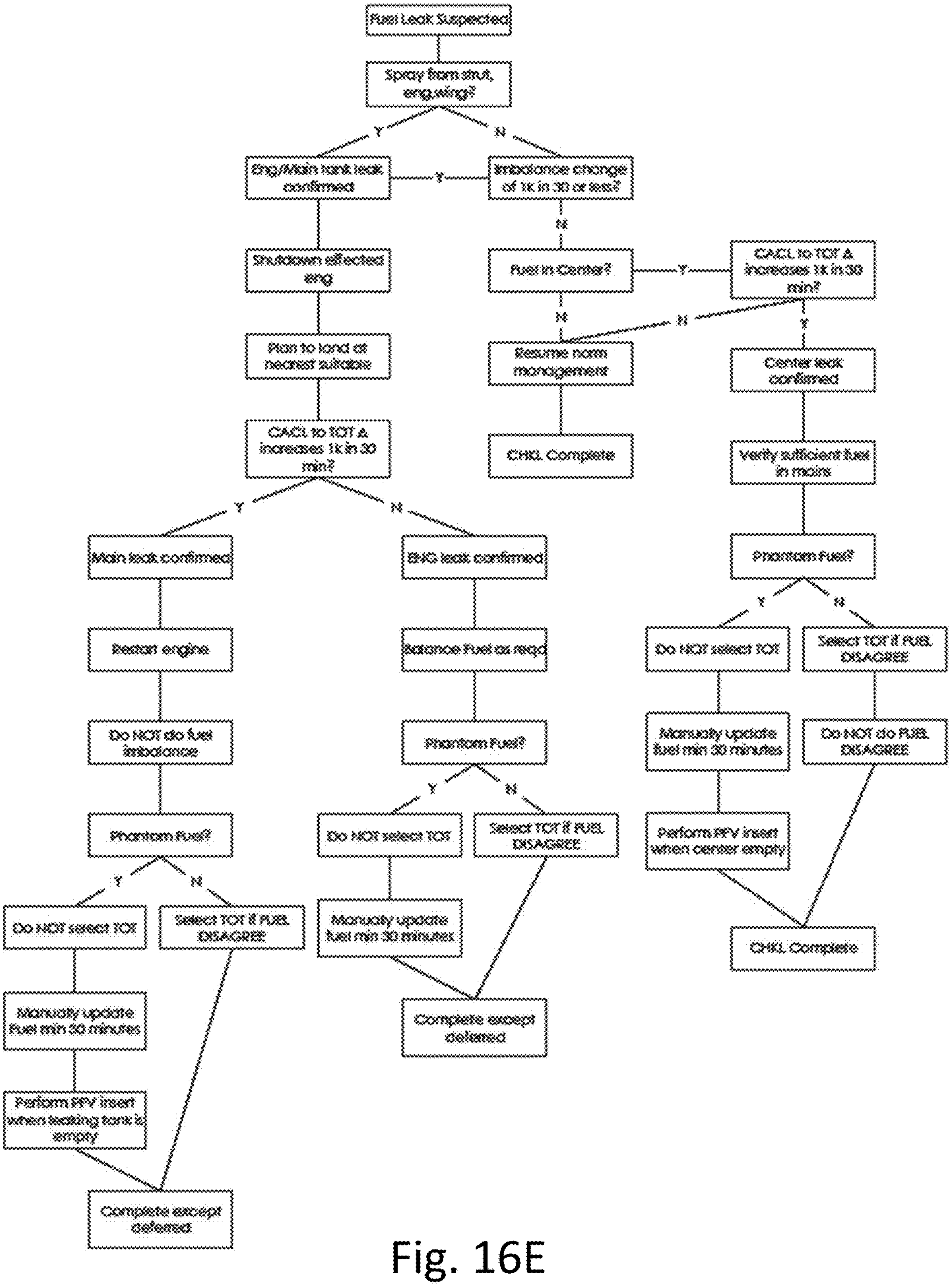

FIG. 16A illustrates a flowchart for evaluating a fuel disagree warning. FIG. 16B illustrates a flowchart for evaluating an insufficient fuel warning. FIG. 16C illustrates a flowchart for evaluating a fuel quantity low warning. FIG. 16D illustrates a flowchart for evaluating a fuel imbalance warning. FIG. 16E illustrates a flowchart for evaluating a suspected fuel leak.

Use of Phantom Fuel procedures will likely cause the FUEL DISAGREE EICAS advisory to display. The FUEL DISAGREE advisory will display when the difference between the fuel quantity determined by the fuel quantity subsystem (i.e., the independent fuel weight parameter value) and the calculated fuel quantity (i.e., the fuel weight parameter value) exceeds 6,500 pounds for a time period of five minutes. The aircraft flight control system has three methods of determining fuel quantity, Calculated, Manual, and Sensed. Under normal operating conditions, the aircraft flight control system uses the calculated method. The calculated method takes a snapshot of the total fuel on board at engine start, based on the fuel quantity subsystem. The aircraft flight control system then subtracts the fuel flow from the snapshot to calculate the fuel quantity. In the Manual method, the snapshot can be overridden with a manual fuel entry on the PERF INIT page, as discussed earlier. The Sensed method uses the fuel quantity determined by fuel quantity subsystem. Since the Phantom Fuel Procedure inserts an artificially high fuel value, 5 minutes after entering the PFV the FUEL DISAGREE advisory will appear. As a result, the crew will need to disregard the FUEL DISAGREE advisory and override the associated ECL (electronic checklist) when in Phantom fuel operations.

The nuisance advisory will remind the crew that Phantom Fuel Procedures are in effect. For instances where the PFV is less than 6,500 lbs there will be a placard stating that the aircraft is capable of operating with Phantom Fuel Procedures. While using the Phantom Fuel Procedure, FQIS is unaffected and the fuel quantity on EICAS will always display an accurate value.

Figure 17:
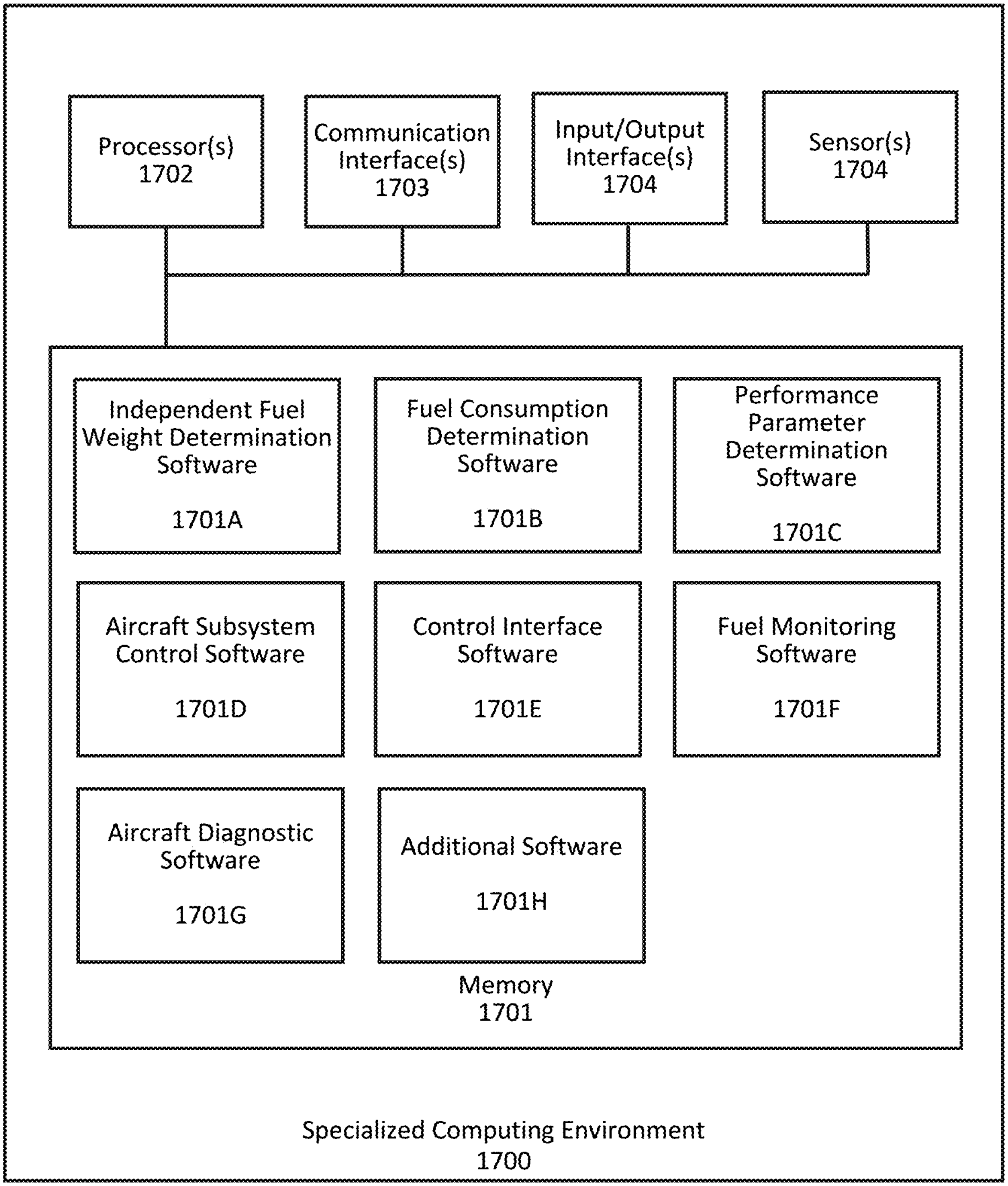
FIG. 17 illustrates an example of a specialized computing environment 1700, such as the aircraft flight control system used to perform the above-described methods and implement the above-described systems.

One or more of the above-described techniques can be implemented in or involve one or more special-purpose computer systems having computer-readable instructions loaded thereon that enable the computer system to implement the above-described techniques. FIG. 17 illustrates an example of a specialized computing environment 1700, such as aircraft flight control system used to perform the above-described methods and implement the above-described systems.

With reference to FIG. 17, the computing environment 1700 includes at least one processing unit/controller 1702 and memory 1701. The processing unit 1702 executes computer-executable instructions and can be a real or a virtual processor. In a multi-processing system, multiple processing units execute computer-executable instructions to increase processing power. The memory 1701 can be volatile memory (e.g., registers, cache, RAM), non-volatile memory (e.g., ROM, EEPROM, flash memory, etc.), or some combination of the two. The memory 1701 can store software implementing the above-described techniques, independent fuel weight determination software 1701A, fuel consumption determination software 1701B, performance parameter determination software 1701C, aircraft subsystem control software 1701D, control interface software 1701E, fuel monitoring software 1701F, aircraft diagnostic software 1701G, and/or additional software 1701H.

All of the software stored within memory 1701 can be stored as a computer-readable instructions, that when executed by one or more processors 1702, cause the processors to perform the functionality described with respect to FIGS. 1-16E.

Processor(s) 1702 execute computer-executable instructions and can be a real or virtual processors. In a multi-processing system, multiple processors or multicore processors can be used to execute computer-executable instructions to increase processing power and/or to execute certain software in parallel.

Specialized computing environment 1700 additionally includes a communication interface 1703, such as a network interface, which is used to communicate with devices, applications, or processes on a computer network or computing system, collect data from devices on a network, such as an aircraft subsystem network, a flight computer network, or a air traffic network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 1700 further includes input and output interfaces 1704 that allow users (such as system administrators) to provide input to the system to set parameters, to edit data stored in memory 1701, or to perform other administrative functions.

An interconnection mechanism (shown as a solid line in FIG. 17), such as a bus, controller, or network interconnects the components of the specialized computing environment 1700.

Input and output interfaces 1704 can be coupled to input and output devices. For example, Universal Serial Bus (USB) ports can allow for the connection of a keyboard, mouse, pen, trackball, touch screen, or game controller, a voice input device, a scanning device, a digital camera, remote control, or another device that provides input to the specialized computing environment 1700.

Specialized computing environment 1700 can additionally utilize a removable or non-removable storage, such as magnetic disks, magnetic tapes or cassettes, CD-ROMs, CD-RWs, DVDs, USB drives, or any other medium which can be used to store information and which can be accessed within the specialized computing environment 1700.

The present system offers many advantages. The disclosed systems and methods ensure that the gross weight utilized by the aircraft flight control system for determination of performance parameters remains accurate, even when operating with a ZFW that is greater than a MZFW limit hard-coded into the aircraft flight control system. Independent sets of sensors onboard the aircraft are used to ensure accurate tracking of the actual amount of fuel on the plane and the rate of fuel burn of the aircraft while at the same time bypassing MZFW requirements using phantom fuel values. Fuel-related warning subsystems are also updated to ensure that fuel-related warnings are adjusted to account for phantom fuel weight. In this way, the present system and method allows for utilization of a ZFW greater than the MZFW without compromising operational requirements of the aircraft and while accurately tracking fuel-relating subsystems.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

We claim:

1. A method executed by one or more computing devices of an aircraft flight control system of an aircraft for calibrating performance parameters of an aircraft during a phantom fuel procedure, the method comprising:

determining, by the aircraft flight control system, an independent fuel weight parameter during operation of the aircraft value based at least in part on an output of one or more fuel level sensors of a fuel quantity subsystem communicatively coupled to the aircraft flight control system, wherein the one or more fuel level sensors comprise hardware sensors configured to detect a current fuel level in one or more fuel tanks of the aircraft;

receiving, via a control interface of the aircraft flight control system, a zero fuel weight parameter value corresponding to a maximum allowable zero fuel aircraft weight;

receiving, via the control interface of the aircraft flight control system, a fuel weight parameter value corresponding to a weight of fuel onboard the aircraft and a phantom fuel value, wherein the phantom fuel value comprises an excess weight value;

determining, by the aircraft flight control system, a gross weight parameter value based at least in part on the zero fuel weight parameter value and the fuel weight parameter value;

determining, by the aircraft flight control system, a fuel consumption parameter value of the aircraft based at least in part on an output of one or more fuel flow sensors communicatively coupled to the aircraft flight control system, wherein the one or more fuel flow sensors comprise hardware sensors configured to detect a rate of fuel flow to one or more engines of the aircraft;

updating, by the aircraft flight control system, the gross weight parameter value during operation of the aircraft based at least in part on the fuel weight parameter value and the fuel consumption parameter value;

determining, by the aircraft flight control system, one or more performance parameter values for the aircraft during operation of the aircraft based at least in part on the gross weight parameter value, the one or more performance parameter values corresponding to one or more operational requirements of the aircraft; and adjusting, by the aircraft flight control system, operation of the aircraft based at least in part on the one or more performance parameters.

2. The method of claim 1, wherein adjusting operation of the aircraft based at least in part on the one or more performance parameters comprises:

transmitting one or more instructions to one or more aircraft subsystems based at least in part on the one or more performance parameter values, wherein the one or more aircraft subsystems are configured to adjust operation of the aircraft based at least in part on the one or more instructions.

3. The method of claim 1, further comprising:

transmitting, by the aircraft flight control system, the performance parameter values on at least one display interface of one or more display interfaces of the aircraft flight control system.

4. The method of claim 1, wherein the one or more performance parameters comprise one or more of: a V-speed, a maneuver margin, a fuel prediction, an approach speed, a holding speed, a flap retraction schedule, a flap extension schedule, a driftdown speed, a maximum altitude, an optimum altitude, a recommended altitude, a takeoff speed, a landing speed, a flap maneuver speed, an upper maneuver margin, a lower maneuver margin, a vertical navigation (VNAV) parameter, or a climb speed.

5. The method of claim 1, further comprising:

transmitting, by the aircraft flight control system, the independent fuel weight parameter value on at least one display interface of one or more display interfaces of the aircraft flight control system.

6. The method of claim 1, further comprising:

updating, by the aircraft flight control system, the fuel weight parameter value during operation of the aircraft based at least in part on the fuel consumption parameter value;

updating, by the aircraft flight control system, a minimum fuel weight parameter value based at least in part on the phantom fuel value; and transmitting, by the aircraft flight control system, an insufficient fuel warning on at least one display interface of one or more display interfaces of the aircraft flight control system based at least in part on a determination that the fuel weight parameter value is less than the minimum fuel weight parameter value.

7. The method of claim 1, further comprising:

detecting, by the aircraft flight control system, a phantom fuel void condition; and setting, by the aircraft flight control system, the fuel weight parameter to be equal to the independent fuel weight parameter based at least in part on detecting the phantom fuel void condition.

8. The method of claim 7, wherein detecting, by the aircraft flight control system, the phantom fuel void condition comprises one or more of:

detecting, by the aircraft flight control system, an invalid fuel flow signal from at least one of the one or more one or more fuel flow sensors; or detecting, by the aircraft flight control system, initiation of a fuel jettison procedure.

9. The method of claim 7, wherein at least one of the one or more performance parameters determined by the aircraft flight control system are adjusted to account for the excess weight.

10. The method of claim 1, further comprising:

transmitting, by the aircraft flight control system, a fuel-related warning on at least one display interface of one or more display interfaces of the aircraft flight control system; and transmitting, by the aircraft flight control system, one or more fuel-related parameters on at least one display interface of the one or more display interfaces of the aircraft flight control system;

wherein the one or more fuel-related parameters are configured to allow an operator of the aircraft to determine whether a fuel leak is a cause of the fuel-related warning.

11. The method of claim 10, wherein the fuel-related warning comprises one of a fuel disagree warning, an insufficient fuel warning, a fuel imbalance warning, or a low fuel quantity warning.

12. An aircraft flight control system for calibrating performance parameters of an aircraft during a phantom fuel procedure, the aircraft flight control system comprising:

one or more processors; and one or more memories operatively coupled to at least one of the one or more processors and having instructions stored thereon that, when executed by at least one of the one or more processors, cause at least one of the one or more processors to:

determine an independent fuel weight parameter during operation of the aircraft value based at least in part on an output of one or more fuel level sensors of a fuel quantity subsystem communicatively coupled to the aircraft flight control system, wherein the one or more fuel level sensors comprise hardware sensors configured to detect a current fuel level in one or more fuel tanks of the aircraft;

receive, via a control interface of the aircraft flight control system, a zero fuel weight parameter value corresponding to a maximum allowable zero fuel aircraft weight;

receive, via the control interface of the aircraft flight control system, a fuel weight parameter value corresponding to a weight of fuel onboard the aircraft and a phantom fuel value, wherein the phantom fuel value comprises an excess weight value;

determine a gross weight parameter value based at least in part on the zero fuel weight parameter value and the fuel weight parameter value;

determine a fuel consumption parameter value of the aircraft based at least in part on an output of one or more fuel flow sensors communicatively coupled to the aircraft flight control system, wherein the one or more fuel flow sensors comprise hardware sensors configured to detect a rate of fuel flow to one or more engines of the aircraft;

update the gross weight parameter value during operation of the aircraft based at least in part on the fuel weight parameter value and the fuel consumption parameter value;

determine one or more performance parameter values for the aircraft during operation of the aircraft based at least in part on the gross weight parameter value, the one or more performance parameter values corresponding to one or more operational requirements of the aircraft; and adjust operation of the aircraft based at least in part on the one or more performance parameters.

13. The aircraft flight control system of claim 12, wherein the instructions that, when executed by at least one of the one or more processors, cause at least one of the one or more processors to adjust operation of the aircraft based at least in part on the one or more performance parameters further cause at least one of the one or more processors to:

transmit one or more instructions to one or more aircraft subsystems based at least in part on the one or more performance parameter values, wherein the one or more aircraft subsystems are configured to adjust operation of the aircraft based at least in part on the one or more instructions.

14. The aircraft flight control system of claim 12, wherein at least one of the one or more memories has further instructions stored thereon that, when executed by at least one of the one or more processors, cause at least one of the one or more processors to:

transmit the performance parameter values on at least one display interface of one or more display interfaces of the aircraft flight control system.

15. The aircraft flight control system of claim 12, wherein the one or more performance parameters comprise one or more of: a V-speed, a maneuver margin, a fuel prediction, an approach speed, a holding speed, a flap retraction schedule, a flap extension schedule, a driftdown speed, a maximum altitude, an optimum altitude, a recommended altitude, a takeoff speed, a landing speed, a flap maneuver speed, an upper maneuver margin, a lower maneuver margin, a vertical navigation (VNAV) parameter, or a climb speed.

16. The aircraft flight control system of claim 12, wherein at least one of the one or more memories has further instructions stored thereon that, when executed by at least one of the one or more processors, cause at least one of the one or more processors to:

transmit the independent fuel weight parameter value on at least one display interface of one or more display interfaces of the aircraft flight control system.

17. The aircraft flight control system of claim 12, wherein at least one of the one or more memories has further instructions stored thereon that, when executed by at least one of the one or more processors, cause at least one of the one or more processors to:

update the fuel weight parameter value during operation of the aircraft based at least in part on the fuel consumption parameter value;

update a minimum fuel weight parameter value based at least in part on the phantom fuel value; and transmit an insufficient fuel warning on at least one display interface of one or more display interfaces of the aircraft flight control system based at least in part on a determination that the fuel weight parameter value is less than the minimum fuel weight parameter value.

18. The aircraft flight control system of claim 12, wherein at least one of the one or more memories has further instructions stored thereon that, when executed by at least one of the one or more processors, cause at least one of the one or more processors to:

detect a phantom fuel void condition; and set the fuel weight parameter to be equal to the independent fuel weight parameter based at least in part on detecting the phantom fuel void condition.

19. The aircraft flight control system of claim 18, wherein the instructions that, when executed by at least one of the one or more processors, cause at least one of the one or more processors to detect the phantom fuel void condition further cause at least one of the one or more processors to perform one or more of:

detecting an invalid fuel flow signal from at least one of the one or more one or more fuel flow sensors; or detecting initiation of a fuel jettison procedure.

20. The aircraft flight control system of claim 18, wherein at least one of the one or more performance parameters determined by the aircraft flight control system are adjusted to account for the excess weight.

21. The aircraft flight control system of claim 12, wherein at least one of the one or more memories has further instructions stored thereon that, when executed by at least one of the one or more processors, cause at least one of the one or more processors to:

transmit a fuel-related warning on at least one display interface of one or more display interfaces of the aircraft flight control system; and transmit one or more fuel-related parameters on at least one display interface of the one or more display interfaces of the aircraft flight control system;

wherein the one or more fuel-related parameters are configured to allow an operator of the aircraft to determine whether a fuel leak is a cause of the fuel-related warning.

22. The aircraft flight control system of claim 21, wherein the fuel-related warning comprises one of a fuel disagree warning, an insufficient fuel warning, a fuel imbalance warning, or a low fuel quantity warning.

23. At least one non-transitory computer-readable medium storing computer-readable instructions for calibrating performance parameters of an aircraft during a phantom fuel procedure that, when executed by one or more computing devices of an aircraft flight control system, cause at least one of the one or more computing devices to:

determine an independent fuel weight parameter during operation of the aircraft value based at least in part on an output of one or more fuel level sensors of a fuel quantity subsystem communicatively coupled to the aircraft flight control system, wherein the one or more fuel level sensors comprise hardware sensors configured to detect a current fuel level in one or more fuel tanks of the aircraft;

receive, via a control interface of the aircraft flight control system, a zero fuel weight parameter value corresponding to a maximum allowable zero fuel aircraft weight;

receive, via the control interface of the aircraft flight control system, a fuel weight parameter value corresponding to a weight of fuel onboard the aircraft and a phantom fuel value, wherein the phantom fuel value comprises an excess weight value;

determine a gross weight parameter value based at least in part on the zero fuel weight parameter value and the fuel weight parameter value;

determine a fuel consumption parameter value of the aircraft based at least in part on an output of one or more fuel flow sensors communicatively coupled to the aircraft flight control system, wherein the one or more fuel flow sensors comprise hardware sensors configured to detect a rate of fuel flow to one or more engines of the aircraft;

update the gross weight parameter value during operation of the aircraft based at least in part on the fuel weight parameter value and the fuel consumption parameter value;

determine one or more performance parameter values for the aircraft during operation of the aircraft based at least in part on the gross weight parameter value, the one or more performance parameter values corresponding to one or more operational requirements of the aircraft; and adjust operation of the aircraft based at least in part on the one or more performance parameters.

24. The at least one non-transitory computer-readable medium of claim 23, wherein the instructions that, when executed by at least one of the one or more computing devices, cause at least one of the one or more computing devices to adjust operation of the aircraft based at least in part on the one or more performance parameters further cause at least one of the one or more computing devices to:

transmit one or more instructions to one or more aircraft subsystems based at least in part on the one or more performance parameter values, wherein the one or more aircraft subsystems are configured to adjust operation of the aircraft based at least in part on the one or more instructions.

25. The at least one non-transitory computer-readable medium of claim 23, further storing computer-readable instructions that, when executed by at least one of the one or more computing devices, cause at least one of the one or more computing devices to:

transmit the performance parameter values on at least one display interface of one or more display interfaces of the aircraft flight control system.

26. The at least one non-transitory computer-readable medium of claim 23, wherein the one or more performance parameters comprise one or more of: a V-speed, a maneuver margin, a fuel prediction, an approach speed, a holding speed, a flap retraction schedule, a flap extension schedule, a driftdown speed, a maximum altitude, an optimum altitude, a recommended altitude, a takeoff speed, a landing speed, a flap maneuver speed, an upper maneuver margin, a lower maneuver margin, a vertical navigation (VNAV) parameter, or a climb speed.

27. The at least one non-transitory computer-readable medium of claim 23, wherein at least one of the one or more memories has further instructions stored thereon that, when executed by at least one of the one or more processors, cause at least one of the one or more processors to:

transmit the independent fuel weight parameter value on at least one display interface of one or more display interfaces of the aircraft flight control system.

28. The at least one non-transitory computer-readable medium of claim 23, further storing computer-readable instructions that, when executed by at least one of the one or more computing devices, cause at least one of the one or more computing devices to:

update the fuel weight parameter value during operation of the aircraft based at least in part on the fuel consumption parameter value;

update a minimum fuel weight parameter value based at least in part on the phantom fuel value; and transmit an insufficient fuel warning on at least one display interface of one or more display interfaces of the aircraft flight control system based at least in part on a determination that the fuel weight parameter value is less than the minimum fuel weight parameter value.

29. The at least one non-transitory computer-readable medium of claim 23, further storing computer-readable instructions that, when executed by at least one of the one or more computing devices, cause at least one of the one or more computing devices to:

detect a phantom fuel void condition; and set the fuel weight parameter to be equal to the independent fuel weight parameter based at least in part on detecting the phantom fuel void condition.

30. The at least one non-transitory computer-readable medium of claim 29, wherein the instructions that, when executed by at least one of the one or more computing devices, cause at least one of the one or more computing devices to detect the phantom fuel void condition further cause at least one of the one or more computing devices to perform one or more of:

detecting an invalid fuel flow signal from at least one of the one or more one or more fuel flow sensors; or detecting initiation of a fuel jettison procedure.

31. The at least one non-transitory computer-readable medium of claim 29, wherein at least one of the one or more performance parameters determined by the aircraft flight control system are adjusted to account for the excess weight.

32. The at least one non-transitory computer-readable medium of claim 23, further storing computer-readable instructions that, when executed by at least one of the one or more computing devices, cause at least one of the one or more computing devices to:

transmit a fuel-related warning on at least one display interface of one or more display interfaces of the aircraft flight control system; and transmit one or more fuel-related parameters on at least one display interface of the one or more display interfaces of the aircraft flight control system;

wherein the one or more fuel-related parameters are configured to allow an operator of the aircraft to determine whether a fuel leak is a cause of the fuel-related warning.

33. The at least one non-transitory computer-readable medium of claim 32, wherein the fuel-related warning comprises one of a fuel disagree warning, an insufficient fuel warning, a fuel imbalance warning, or a low fuel quantity warning.

* * * * *